US008887245B1

(12) United States Patent
Wiltzius et al.

(10) Patent No.: US 8,887,245 B1
(45) Date of Patent: Nov. 11, 2014

(54) BROWSER-BASED PREVENTION OF UNSECURE ONLINE TRANSMISSION OF SENSITIVE INFORMATION

(71) Applicant: Google Inc., Mountain View, CA (US)

(72) Inventors: Thomas C. Wiltzius, Santa Barbara, CA (US); Gideon Wald, San Francisco, CA (US); Gregory M. Marra, San Francisco, CA (US); Kathryn Cushing, San Francisco, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 13/716,343

(22) Filed: Dec. 17, 2012

Related U.S. Application Data

(60) Provisional application No. 61/580,795, filed on Dec. 28, 2011.

(51) Int. Cl.
*H04L 29/06* (2006.01)

(52) U.S. Cl.
CPC ............... *H04L 63/08* (2013.01); *H04L 63/04* (2013.01); *H04L 63/1433* (2013.01)
USPC .................................. 726/4; 726/25; 726/26

(58) Field of Classification Search
CPC ...... H04W 12/02; H04W 12/12; H04L 63/04; H04L 63/1433; H04L 63/1483
USPC ..................... 726/28–30, 4, 25–26
See application file for complete search history.

(56) References Cited

U.S. PATENT DOCUMENTS

| 7,886,359 | B2 * | 2/2011 | Jones et al. ..................... 726/26 |
| 7,937,761 | B1 * | 5/2011 | Bennett ........................... 726/23 |
| 8,079,087 | B1 * | 12/2011 | Spies et al. ...................... 726/26 |
| 2006/0089970 | A1 * | 4/2006 | Pearson et al. ................. 709/206 |
| 2007/0101427 | A1 * | 5/2007 | Toomey .......................... 726/22 |
| 2008/0016341 | A1 * | 1/2008 | Staddon et al. ................ 713/165 |
| 2008/0046812 | A1 * | 2/2008 | Reynar et al. ................. 715/234 |
| 2008/0082821 | A1 * | 4/2008 | Pritikin ......................... 713/169 |
| 2009/0006867 | A1 * | 1/2009 | Choyi et al. .................. 713/193 |

* cited by examiner

*Primary Examiner* — Hadi Armouche
*Assistant Examiner* — Sher Khan
(74) *Attorney, Agent, or Firm* — Harrity & Harrity, LLP

(57) ABSTRACT

A device receives, from an online provider device, content of a website and connection information associated with the website, and provides the content of the website for display to a user. The device also receives, from the user, information requested by the website and a request to provide the information to the online provider device, and determines whether the information includes sensitive information. The device further provides the information to the online provider device, based on the request, when the information does not include sensitive information, and determines, when the information includes sensitive information, whether the website is safe or unsafe based on the connection information. The device provides a warning for display to the user, when the information includes sensitive information and when the website is an unsafe website, where the warning indicates that sensitive information is to be transmitted to the unsafe website.

19 Claims, 25 Drawing Sheets

FIG. 11

Information Input

Welcome to your web browser! Please provide the following information for web browser storage. The information may be used, with your approval, to complete transactions with trusted online providers.

1110
- Name: James Smith
- Address: 123 Maple Lane, City, State

1120
- Credit Card Type: Bank card
- Credit Card Number: 1111-2222-3333-4444
- CVV Number: 456
- Expiration Date: 01/2014

1130 → Social Security Number: XXX-YY-ZZZZ

Job Application

Note: This website is trusted/secure. Do you want to automatically populate the form with the information stored in your web browser?

[Yes] [No] ← 1310

FORM (1320)

Name: James Smith
Address: 31 Lake Road, City, State
Social Security Number: XXX-YY-ZZZZ
Tax ID: 1234-5678-9123-4567
. . .

[Submit] ← 1330

1300

BROWSER-BASED PREVENTION OF UNSECURE ONLINE TRANSMISSION OF SENSITIVE INFORMATION

RELATED APPLICATION

This application claims priority under 35 U.S.C. §119 based on U.S. Provisional Patent Application No. 61/580,795, filed Dec. 28, 2011, the disclosure of which is incorporated by reference herein in its entirety.

BACKGROUND

The Internet or World Wide Web (web) contains a vast amount of information, and is a dangerous place for users who are not familiar with the security issues presented by the Internet. Several online activities require submission of sensitive information, such as social security numbers, bank passwords, credit card numbers, personal information, etc., in web forms to online providers (e.g., websites). Most online providers enable safe and secure transmissions of such sensitive information. However, certain online providers utilize the sensitive information for improper purposes, such as credit card theft, identity theft and fraud purposes, etc. Thus, these unscrupulous online providers do not provide for safe and secure transmissions of sensitive information.

It is difficult to protect users against the threat of improper use of sensitive information for a variety of reasons. One reason that it is difficult to protect users is that many users lack the awareness to be able to distinguish between trustworthy online providers and untrustworthy online providers. For example, inexperienced Internet users find it difficult to identify whether a website's connection is secure or is not secure. Even experienced Internet users forget to check for website security indicators, such as secure socket layer (SSL) indicators, or do not know that such security indicators exist. Furthermore, these website security indicators provide a variety of confusing security information that even the savviest Internet users may not fully understand.

SUMMARY

According to one possible implementation, a method may include receiving, by a device and from an online provider device, website information associated with a website and connection information associated with the website, providing, by the device, the website for display to a user, and receiving, by the device and from the user, information and a request to provide the information to the online provider device. The method may also include determining, by the device, whether the information includes sensitive information, determining, by the device and when the information includes sensitive information, whether the website is safe or unsafe based on the website information and the connection information, and providing, by the device and when the website is an unsafe website, a warning for display to the user, where the warning indicates that sensitive information is to be transmitted to the unsafe website.

According to another possible implementation, a device may include one or more processors to: receive, from an online provider device, content of a website and connection information associated with the website; provide the content of the website for display to a user; receive, from the user, information requested by the website and a request to provide the information to the online provider device; determine whether the information includes sensitive information; provide the information to the online provider device, based on the request, when the information does not include sensitive information; determine, when the information includes sensitive information, whether the website is safe or unsafe based on the connection information; and provide a warning for display to the user, when the information includes sensitive information and when the website is an unsafe website, where the warning indicates that sensitive information is to be transmitted to the unsafe website.

According to yet another possible implementation, a computer-readable medium may include one or more instructions that, when executed by one or more processors of a device, cause the one or more processors to: receive one or more lists of unsafe websites and one or more lists of safe websites; receive, from an online provider device, content of a website and connection information associated with the website; provide the content of the website for display to a user; receive, from the user, information requested by the website; receive, from the user, a request to provide the information to the online provider device; determine whether the information includes sensitive information; provide the information to the online provider device, based on the request, when the information does not include sensitive information; determine, when the information includes sensitive information, whether the website is safe or unsafe based on the connection information, the one or more lists of unsafe websites, and the one or more lists of safe websites; and provide a warning for display to the user, when the information includes sensitive information and when the website is an unsafe website, where the warning indicates that sensitive information is to be transmitted to the unsafe website.

BRIEF DESCRIPTION OF THE DRAWINGS

The accompanying drawings, which are incorporated in and constitute a part of this specification, illustrate one or more implementations described herein and, together with the description, explain these embodiments. In the drawings:

FIGS. 11-18 are diagrams of additional example user interfaces capable of being generated or provided by the client device via the browser;

DETAILED DESCRIPTION

The following detailed description refers to the accompanying drawings. The same reference numbers in different drawings may identify the same or similar elements.

Overview

In the description to follow, reference will be made to documents and websites. A document, as the term is used herein, is to be broadly interpreted to include any machine-readable and machine-storable work product. A document may include, for example, an e-mail, a file, a combination of files, one or more files with embedded links to other files, a news group posting, a blog, a web advertisement, a Uniform Resource Locator (URL), etc. In the context of the Internet, a common document is a web page. Web pages often include textual information and may include embedded information, such as meta information, images, hyperlinks, etc., and/or embedded instructions, such as Javascript, etc. A website, as used herein, is to be broadly interpreted to include a collection of related documents, such as documents associated with a same host, domain, or organization. For example, the collection of related documents might include all or a subset of the documents associated with a traditional website, directory, or sub-directory, or some other set of documents that are related to each other on the same host or domain, or associated with the same organization.

As used herein, the term user is intended to be broadly interpreted to include a client device or a user of a client device.

Systems and/or methods described herein may enable a browser to warn an unsuspecting user when the user is attempting to submit sensitive information in an unsafe environment, such as to an untrustworthy and/or unsecure website. The browser may also prevent the user from submitting the sensitive information to the unsafe environment. The sensitive information may include personal information (e.g., a social security number, an address, a driver's license number, etc.), financial information (e.g., a credit card number, a bank account number, a tax identification, etc.), and/or other information (e.g., passwords, personal identification numbers (PINs), etc.). The sensitive information, if made public to an untrustworthy website, may compromise the user's financial accounts, identity, etc. To further protect the sensitive information, the browser may be a trusted intermediary of the sensitive information and may only disclose the sensitive information to trustworthy and/or secure websites.

Figure 1:
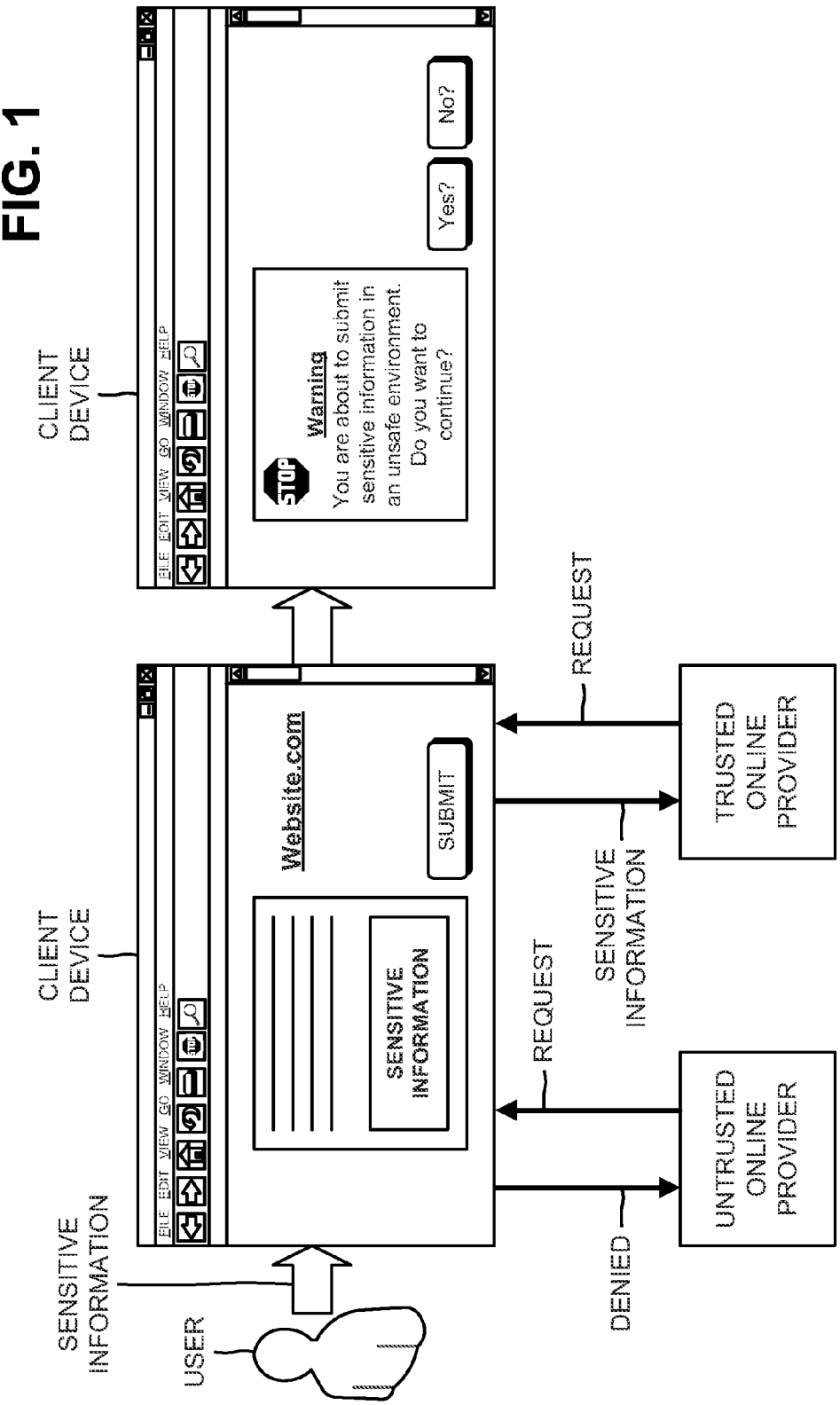
FIG. 1 is a diagram of an overview of an example implementation described herein.

For example, in one implementation, as shown in FIG. 1, a user of a client device, such as a desktop computer, may utilize a browser to access a website. The website may request that the user input sensitive information to the website and transmit the sensitive information to an online provider of the website. For example, the website may request that the user submit credit card information in order to complete an online purchase. The browser may identify the sensitive information, and may determine whether the website is trustworthy and/or secure before transmitting the sensitive information to the online provider. If the browser determines that the website is an unsafe environment (i.e., is untrustworthy and/or unsecure), the browser may provide a warning to the user. The warning may inform the user that sensitive information is about to be submitted in an unsafe environment, and may request that the user confirm whether to submit the sensitive information to the website.

Alternatively, or additionally, the user may input the sensitive information to the client device, and the client device may securely store the information in the browser. As further shown in FIG. 1, when the user visits a website of a trusted online provider, the online provider may provide a request, such as an application programming interface (API) call, to the browser. The request may request that the browser provide some or all of the stored sensitive information to the trusted online provider. If the browser determines that the online provider is trustworthy and/or secure, the browser may automatically provide the stored sensitive information to the trusted online provider. However, if an untrusted online provider provides a similar request to the browser, the browser may determine that the online provider is untrustworthy and/or unsecure, and may deny the request for the sensitive information.

The description to follow will describe functionality included as part of a web browser (referred to herein as a "browser"). It should be understood that the description may equally apply to other implementations. For example, the browser functionality may be implemented as a browser assistant that may include executable code, such as a plug-in, an applet, a dynamic link library (DLL), an extension, or a similar type of executable object or process that operates in conjunction with, or separately from, a browser. In one example implementation, the browser assistant may take the form of an add-on for a browser, a selectable object embedded within a document currently being displayed within a browser window, or a function included within a frame within a browser window. Alternatively, or additionally, other mechanisms—which may or may not be integrated within a browser—may also be used to provide the browser functionality described herein.

Example Network Configuration

Figure 2:
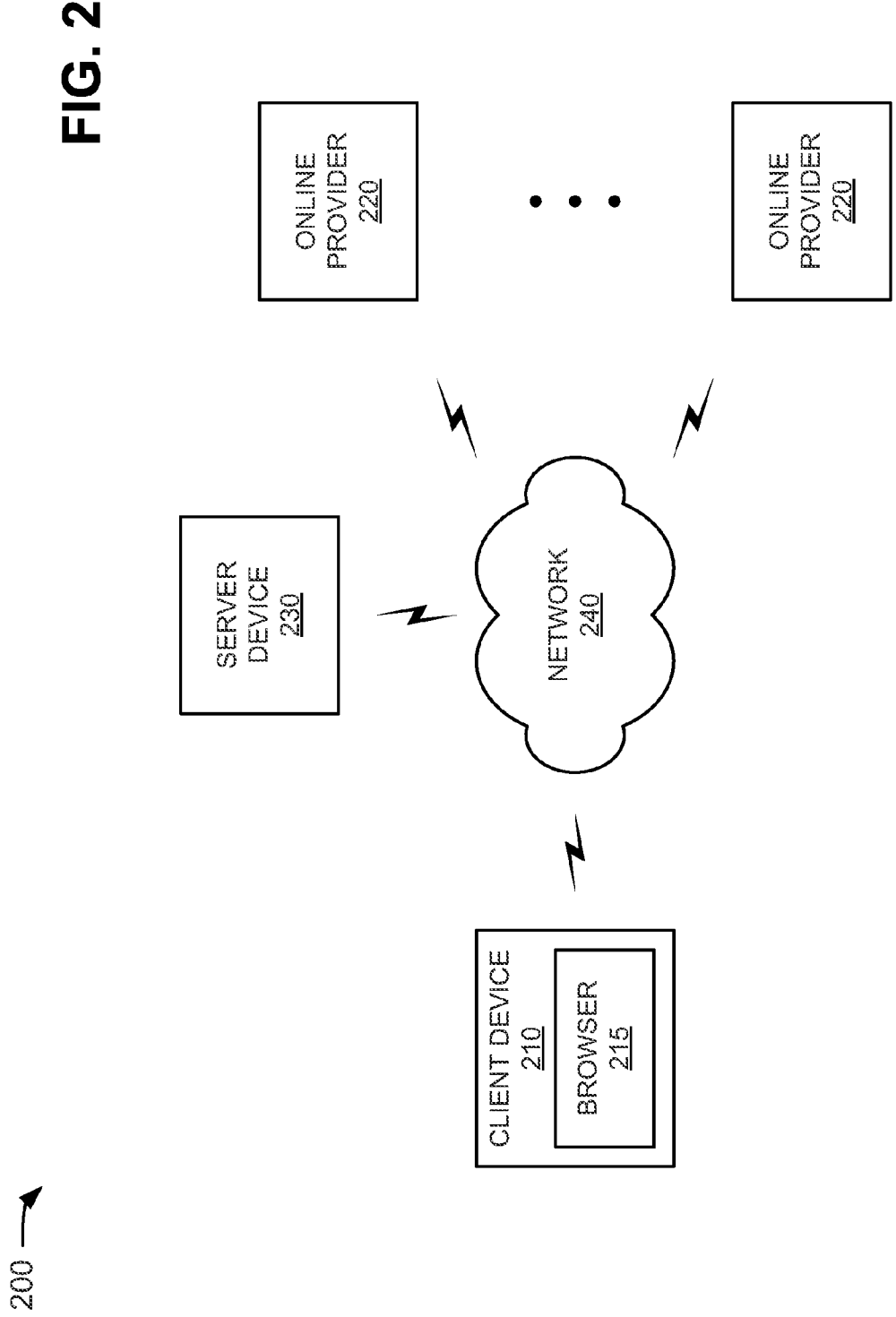
FIG. 2 is a diagram of an example network in which systems and/or methods described herein may be implemented.

FIG. 2 is a diagram of an example network 200 in which systems and/or methods described herein may be implemented. As illustrated, network 200 may include a client device 210 with a browser 215, multiple online providers 220, and a server device 230 interconnected by a network 240. Devices and/or networks of network 200 may interconnect via wired and/or wireless connections. One client device 210, one browser 215, two online providers 220, one server device 230, and one network 240 have been illustrated in FIG. 1 for simplicity. In practice, there may be additional client devices 210, browsers 215, online providers 220, server devices 230, and/or networks 240.

Client device 210 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a gaming system; a set-top box (STB); a television; or other types of computation and communication devices. In one example, client device 210 may include a device that is capable of communicating with online providers 220 and/or server device 230 via network 240.

Browser 215 may include any type of web browser, such as Google's Chrome™. In one example, browser 215 may be executed by client device 210, and the functionality of browser 215 may be provided to a user of client device 210, such as via a display of client device 210. In one example implementation, functionality described herein as being performed by browser 215 may be performed by client device 210 executing browser 215.

Online provider 220 may include one or more server devices, or other types of computation and communication devices, that gather, process, search, and/or provide information in a manner described herein. In one example implementation, each of online providers 220 may include one or more devices associated with a provider of online services, such as an entertainment provider (e.g., a provider of music, movies, etc.), a search provider, an online shopping website provider, an online finance or online banking website provider, an online health website provider, etc. Online providers 220 may provide the online services to a user of client device 210, via browser 215. For example, if online provider 220 sells merchandise online, online provider 220 may provide, via browser 215, listings of merchandise or services for purchase by the user. At particular times, online providers 220 may request sensitive information from a user of client device 210/browser 215. For example, during checkout, the merchandise online provider 220 may request that the user provide credit card information to online provider 220 in order to complete a purchase of merchandise or a service.

Some online providers 220 may be considered "safe" or "trusted" online providers 220 since such online providers 220 may be trustworthy and/or may provide a secure connection for transmission of the user's sensitive information. Other online providers 220 may be considered "unsafe" or "untrusted" online providers 220 since such online providers 220 may be untrustworthy and/or may provide an unsecure connection for transmission of the user's sensitive information.

Server device 230 may include one or more server devices, or other types of computation and communication devices, that gather, process, search, and/or provide information in a manner described herein. In one example implementation, server device 230 may provide, to browser 215, one or more lists of untrustworthy websites and/or online providers 220 (e.g., referred to herein as "blacklists"); one or more lists of trustworthy websites and/or online providers 220 (e.g., referred to herein as "whitelists"); and/or other information that may provide an indication of a trustworthiness or untrustworthiness of websites and/or online providers 220. For example, the blacklists may include lists of websites with known unscrupulous behavior, such as websites known to generate spam—i.e., unsolicited bulk messages that are indiscriminately sent—; phishing websites—i.e., websites that attempt to acquire sensitive information by masquerading as trustworthy websites—; websites reported to the Better Business Bureau; etc. The whitelists, for example, may include lists of trusted websites, such as websites that are certified by an accreditation agency (e.g., the Better Business Bureau), etc.

Network 240 may include a local area network (LAN), a wide area network (WAN), a metropolitan area network (MAN), a telephone network, such as the Public Switched Telephone Network (PSTN) or a cellular network, an intranet, the Internet, an optical fiber (or fiber optic)-based network, or a combination of networks.

Although FIG. 2 shows example devices/networks of network 200, in other implementations, network 200 may include fewer devices/networks, different devices/networks, differently arranged devices/networks, or additional devices/networks than depicted in FIG. 2. Alternatively, or additionally, one or more devices/networks of network 200 may perform one or more other tasks described as being performed by one or more other devices/networks of network 200.

Example Device Components

Figure 3:
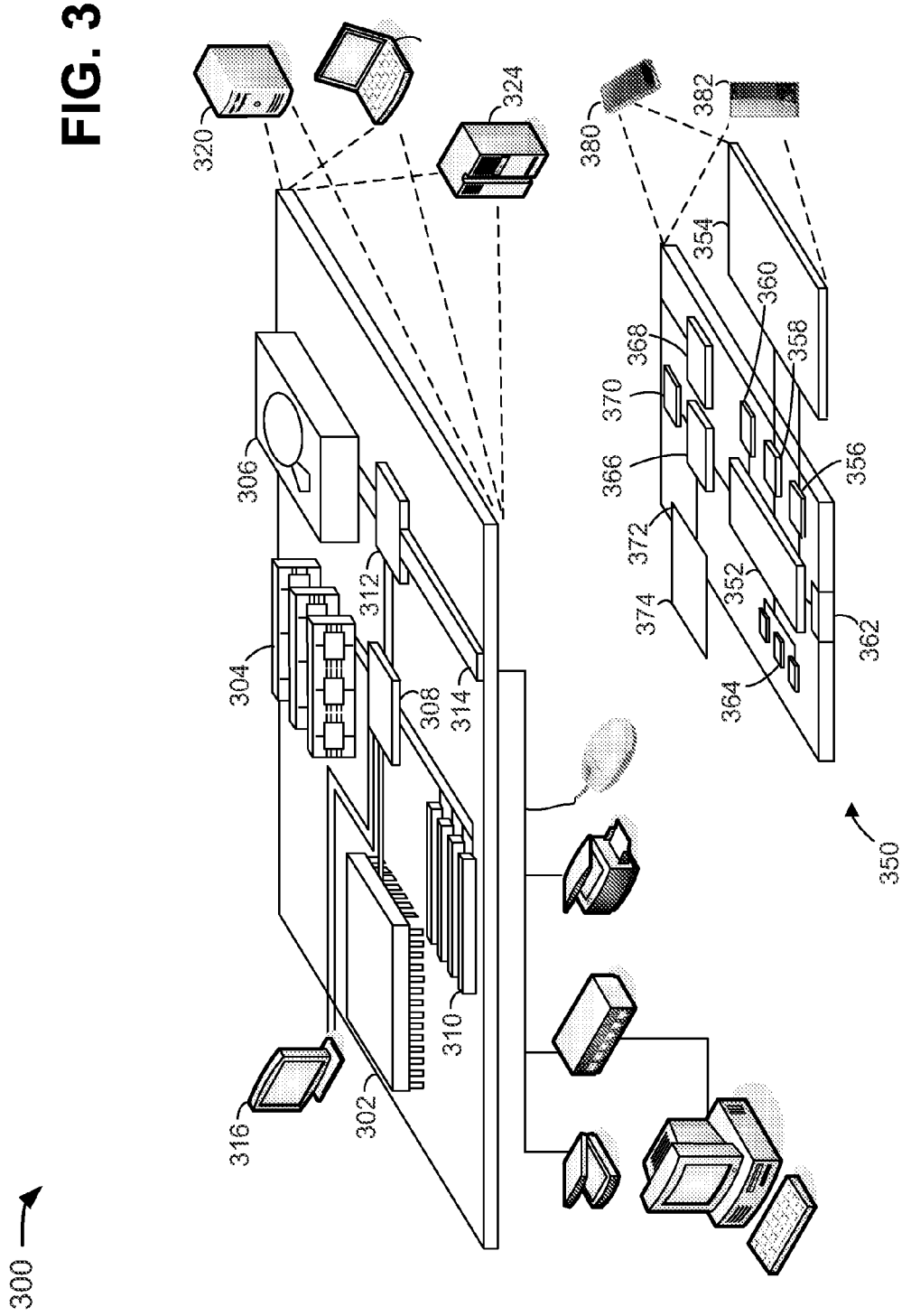
FIG. 3 is a diagram of an example of a generic computing device and a generic mobile computing device, which may be used with the techniques described here.

FIG. 3 is a diagram of an example of a generic computing device 300 and a generic mobile computing device 350, which may be used with the techniques described here. Generic computing device 300 or generic mobile computing device 350 may correspond to, for example, a client device 210, online provider 220, and/or server device 230. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to memory 304 and high-speed expansion ports 310, and a low-speed interface 312 connecting to a low-speed expansion port 314 and a storage device 306. Each of components 302, 304, 306, 308, 310, 312, and 314, are interconnected using various buses, and may be mounted on a common motherboard or in other manners as appropriate. Processor 302 can process instructions for execution within computing device 300, including instructions stored in memory 304 or on storage device 306 to display graphical information for a graphical user interface (GUI) on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In one implementation, memory 304 includes a volatile memory unit or units. In another implementation, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is only an example. In one implementation, high-speed interface 308 is coupled to memory 304, display 316 (e.g., through a graphics processor or accelerator), and to high-speed expansion ports 310, which may accept various expansion cards (not shown). In this implementation, low-speed interface 312 may be coupled to storage device 306 and low-speed expansion port 314. Low-speed expansion port 314, which may include various communication ports (e.g., USB, Bluetooth, Ethernet, wireless Ethernet, etc.), may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, computing device 300 may be implemented as a standard server 320, or multiple times in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, a memory 364, an input/output ("I/O") device, such as a display 354, a communication interface 366, and a transceiver 368, among other components. Mobile computing device 350 may also be provided with a storage device, such as a microdrive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert the received spoken information to digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in the figure. For example, mobile computing device 350 may be implemented as a cellular telephone 380. Mobile computing device 350 may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Figure 4:
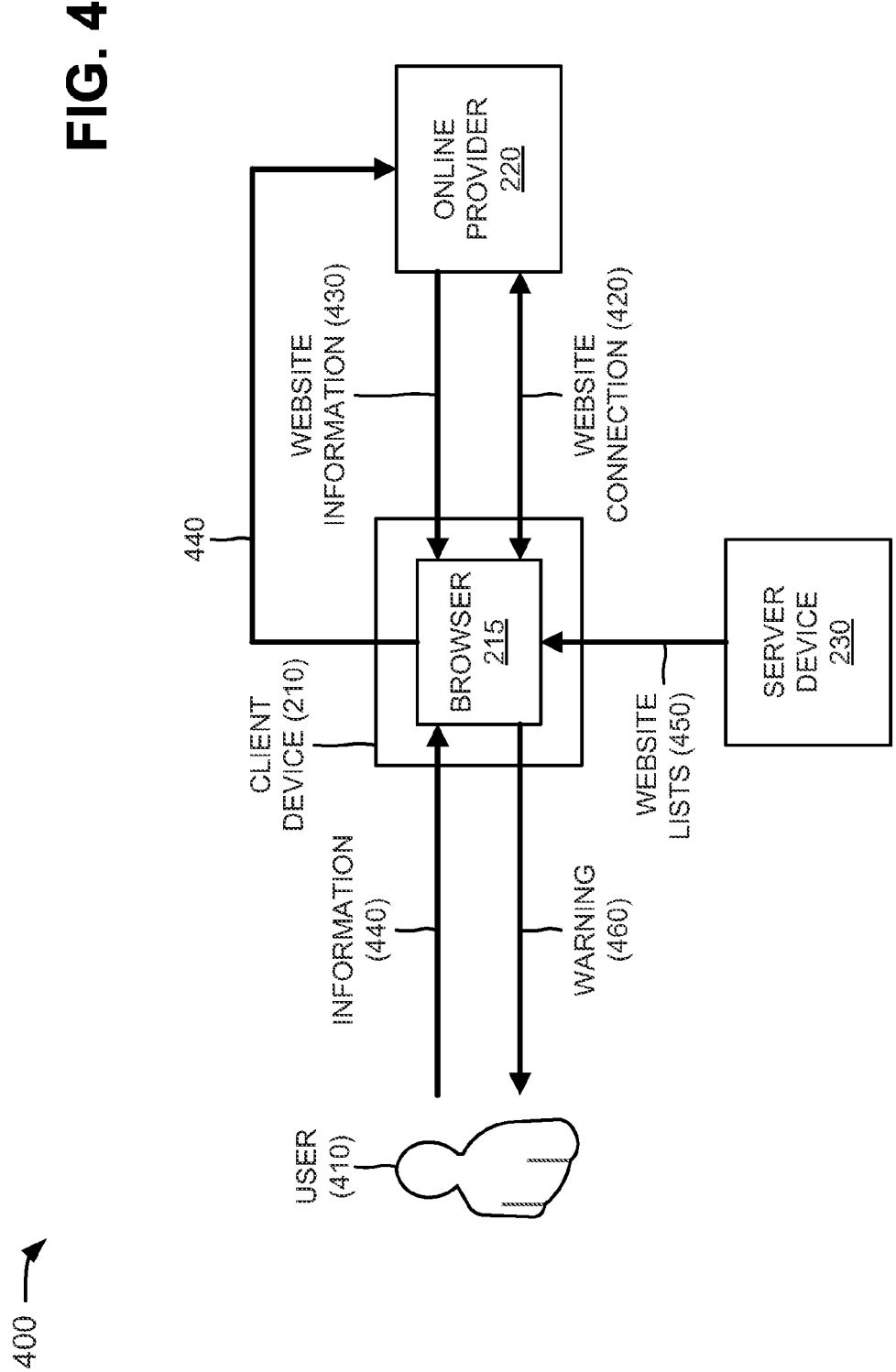
FIG. 4 is a diagram of example operations capable of being performed by an example portion of the network.

Example Operations for Prevention of Unsecure Transmission of Sensitive Information FIG. 4 is a diagram of example operations capable of being performed by an example portion 400 of network 200 (FIG. 2). As shown, network portion 400 may include client device 210, browser 215, online provider 220, and server device 230. Client device 210, browser 215, online provider 220, and server device 230 may include the features described above in connection with, for example, one or more of FIGS. 2 and 3.

As further shown in FIG. 4, a user 410 may be associated with client device 210, and may interact with client device 210 via browser 215. Browser 215 and online provider 220 may establish a website connection 420 with each other so that online provider 220 may present a website to user 410, via browser 215. Information associated with website connection 420 may be provided to browser 215, and browser 215 may receive the information. The information associated with website connection 420 may include information identifying whether website connection 420 is a secure connection, a broken connection, or an unsecure connection; information identifying whether encryption associated with website connection 420 is current or outdated; information identifying whether a certificate associated with website connection 420 is trusted or untrusted (e.g., invalid, expired, self signed by online provider 220, etc.); etc.

Online provider 220 may provide website information 430 to browser 215. Browser 215 may receive website information 430, and may display website information 430 to user 410, via a display of client device 210. Website information 430 may include information associated with the website provided by online provider 220 to browser 215. For example, if online provider 220 is an online shopping website provider, website information 430 may include information associated with merchandise or services offered for sale by the online shopping website provider. Alternatively, or additionally, if online provider 220 is an online banking website provider, website information 430 may include information associated with banking services (e.g., online checking, online bill paying, etc.) offered by the online banking website provider. Website information 430 may also include information identifying whether encryption associated with website connection 420 is current or outdated; information identifying whether a certificate associated with website connection 420 is trusted or untrusted; etc.

As further shown in FIG. 4, user 410 may provide information 440 to browser 215, and browser 215 may receive information 440. Information 440 may include information requested by online provider 220 via the website provided by online provider 220. For example, information 440 may include a name, an address, credit card information, etc., associated with user 410, that online provider 220 requests in order to complete an online transaction (e.g., a purchase of merchandise). Server device 230 may periodically and automatically provide website lists 450 to browser 215, or may provide website lists 450 in response to browser 215 requesting website lists 450. Website lists 450 may include one or more blacklists, one or more whitelists, and/or other information that may provide an indication of a trustworthiness or untrustworthiness of the website and/or online provider 220.

User 410 may request that information 440 be provided to online provider 220. For example, if user 410 entered information 440 into fields of the website provided by online provider 220, user 410 may request that the entered information 440 be provided to online provider 220 via a submit mechanism (e.g., a button, an icon, a link, etc.). Prior to providing information 440 to online provider 220, browser 215 may determine whether information 440 contains any sensitive information, such as a credit card number, a social security number, a password, a PIN, a driver's license number, etc. Further details of how browser 215 makes this determination are provided below in connection with FIG. 5. If browser 215 determines that information 440 does not contain sensitive information, browser 215 may provide information 440 to online provider 220, as shown in FIG. 4.

However, if browser 215 determines that information 440 includes sensitive information, browser 215 may determine whether the website provided by online provider 220 is safe or unsafe based on the information associated with website connection 420, website information 430, and/or website lists 450. Further details of how browser 215 makes this determination are provided below in connection with FIG. 5. If browser 215 determines that the website provided by online provider 220 is safe, browser 215 may provide information 440, including the sensitive information, to online provider 220. However, if browser 215 determines that the website provided by online provider 220 is unsafe, browser 215 may display, to user 410, a warning 460 that indicates that sensitive information is about to be transmitted to an unsafe website.

User 410 may heed warning 460 and elect to not provide information 440 to online provider 220, or may ignore warning 460 and elect to provide information 440 to online provider 220. Alternatively, or additionally, browser 215 may prevent information 440 from being provided to online provider 220 when information 440 contains sensitive information and the website is unsafe. Such an arrangement may prevent user 410 from ignoring warning 460 and unwittingly providing information 440 to online provider 220.

In one example implementation, browser 215 may enable user 410 to elect to provide only non-sensitive information, provided in information 440, to online provider 220 when information 440 contains sensitive and non-sensitive information and the website is unsafe. In such an arrangement, browser 215 may prevent the sensitive information, provided in information 440, from being provided to online provider 220.

Although FIG. 4 shows example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

Example Browser Functional Components

Figure 5:
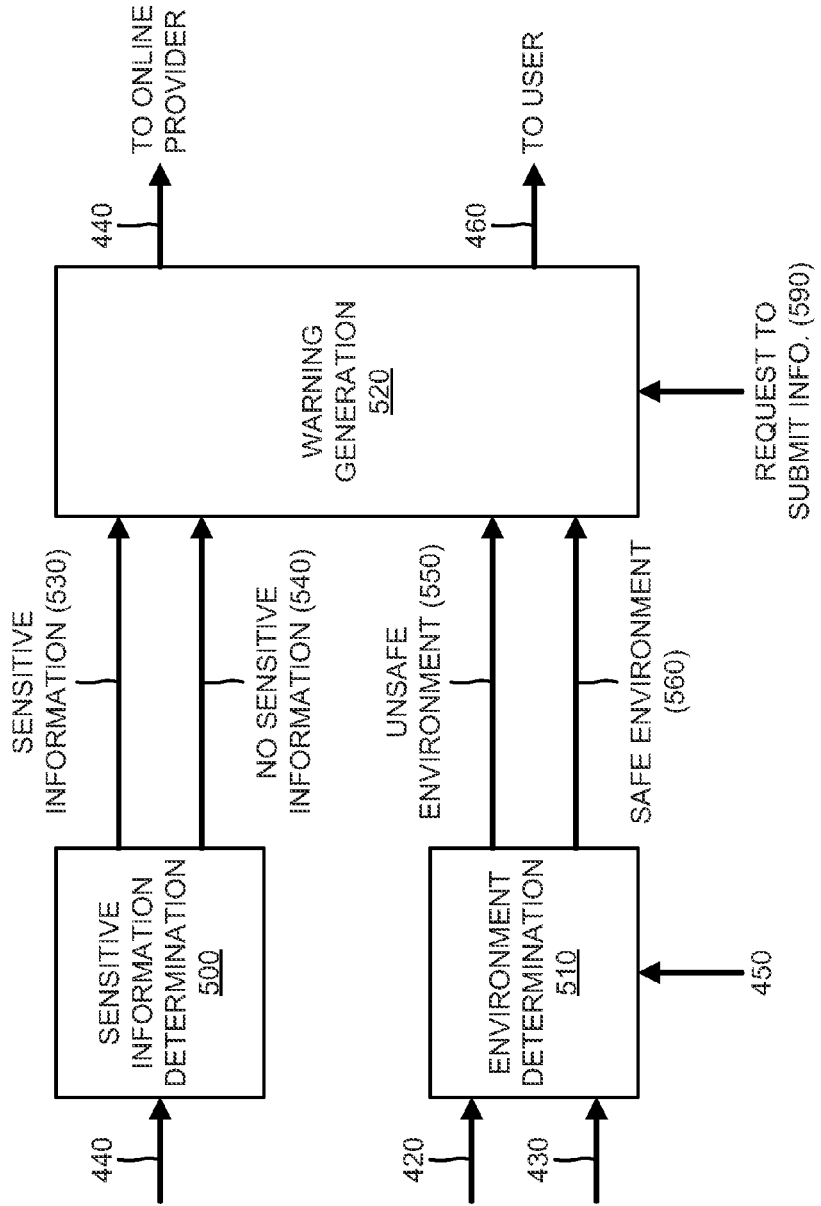
FIG. 5 is a diagram of example functional components of a browser of a client device depicted in FIG. 2.

FIG. 5 is a diagram of example functional components of browser 215. In one implementation, the functions described in connection with FIG. 5 may be performed by one or more components of device 300/350 (FIG. 3) or by one or more devices 300/350. As shown in FIG. 5, browser 215 may include a sensitive information determination component 500, an environment determination component 510, and a warning generation component 520.

Sensitive information determination component 500 may receive information 440 and may determine whether information 440 contains sensitive information. Sensitive information may include information that, if made public to an untrustworthy website, may compromise the user's financial accounts, identity, etc. For example, sensitive information may include personal information of user 410—e.g., a social security number, a name, a mailing address, a driver's license number, a passport identification, etc.—; financial information of user 410—e.g., a credit card number, a credit card verification value (CVV), a credit card expiration date, a bank account number, a password for a bank account, a debit card number, a tax identification, etc.—; medical information of user 410—e.g., a medical record number, a group number, medical conditions, etc.—; online payment verification system information of user 410—e.g., a PayPal™ username and password, etc.—; and/or other information associated with user 410—e.g., passwords, PINs, etc.—.

Sensitive information determination component 500 may determine whether information 440 contains sensitive information in a variety of ways. In one example implementation, sensitive information determination component 500 may utilize pattern recognition, such as classification, regression, sequence labeling, parsing, etc., to determine whether information 440 includes sensitive information. For example, if information 440 includes numbers with a particular format, such as a credit card number (e.g., 1234-5678-9123-4567) or a social security number (e.g., 123-45-6789), the pattern recognition may be able to identify, with high confidence, such information as sensitive information. The pattern recognition may also be used to identify alphanumeric information with a particular format, such as a mailing address that takes the form of a house number, a street name, a city name, a state name, and a zip code.

Sensitive information determination component 500 may also utilize information obtained from the website provided by online provider 220 to determine whether information 440 includes sensitive information. For example, if information 440 is entered in a website field next to the words "social security number," sensitive information determination component 500 may determine that the entered information 440 is a social security number, and thus sensitive information.

If information 440 includes passwords (e.g., to other websites) with no particular format, the pattern recognition may not be able to identify, with high confidence, such information as sensitive information. However, browser 215 may store a list of passwords associated with user 410 (e.g., passwords used for automatically filling in online information), and sensitive information determination component 500 may compare the passwords to the list. Passwords that match the list may be identified as sensitive information by sensitive information determination component 500. If user 410 utilizes a particular password to sign into browser 215 for synchronization of email, address book, calendar, etc. information from client device 210 with information of another client device (e.g., a mobile device), sensitive information determination component 500 may compare the particular password to information 440. If the particular password matches some or all of information 440, sensitive information determination component 500 may determine that information 440 contains sensitive information. Browser 215 may also utilize a list of common terms (e.g., "the," "and," "or," etc.) to prevent sensitive information determination component 500 from determining such common terms as sensitive information.

Alternatively, or additionally, sensitive information determination component 500 may utilize heuristic recognition, such as contextual recognition, to determine whether information 440 includes sensitive information. For example, if sensitive information determination component 500 identifies a mailing address in information 440 and identifies a number pattern after the mailing address, sensitive information determination component 500 may utilize this contextual information to determine that the number pattern may be a credit card number. If sensitive information determination component 500 identifies unique or unidentifiable information after a mailing address in information 440, sensitive information determination component 500 may determine that the unique information is most likely sensitive information. In another example, sensitive information determination component 500 may determine a three digit number, identified after an identified credit card number, to be a CVV number and thus sensitive information. If one or more portions (e.g., fields) of information 440 are determined to include sensitive information, sensitive information determination component 500 may determine whether the number of fields is greater than a particular threshold number that may be automatically set by browser 215 or manually set by user 410. If the number of fields containing sensitive information is greater than the particular threshold number, sensitive information determination component 500 may determine that other fields of information 440 contain sensitive information.

As further shown in FIG. 5, if sensitive information determination component 500 identifies sensitive information in a portion of information 440 or in a threshold amount of information 440, sensitive information determination component 500 may provide, to warning generation component 520, an indication 530 that information 440 includes sensitive information. If sensitive information determination component 500 fails to identify sensitive information in a portion of information 440 or in a threshold amount of information 440, sensitive information determination component 500 may provide, to warning generation component 520, an indication 540 that information 440 does not include sensitive information.

Environment determination component 510 may receive the information associated with website connection 420, website information 430, and website lists 450, and may determine whether the website provided by online provider 220 is safe or unsafe based on the received information. Environment determination component 510 may determine whether the website is safe or unsafe in a variety of ways. In one example implementation, environment determination component 510 may analyze the information associated with website connection 420 to determine whether the website is safe or unsafe. For example, if the information associated with website connection 420 indicates that website connection 420 is not a secure connection (e.g., a SSL connection), environment determination component 510 may determine the website to be unsafe. If the information associated with website connection 420 indicates that website connection 420 is a secure connection, environment determination component 510 may determine the website to be safe. If the information associated with website connection 420 indicates that website connection 420 is a secure connection but that the secure connection is broken, environment determination component 510 may determine the website to be unsafe.

Alternatively, or additionally, environment determination component 510 may analyze website information 430 to determine whether the website is safe or unsafe. For example, if website information 430 indicates that an encryption associated with the website is outdated, environment determination component 510 may determine the website to be unsafe. If website information 430 indicates that the encryption associated with the website is current, environment determination component 510 may determine the website to be safe. If website information 430 indicates that a certificate associated with the website is not trusted (e.g., invalid, expired, self signed, etc.), environment determination component 510 may determine the website to be unsafe. If website information 430 indicates that the certificate associated with the website is valid and trusted, environment determination component 510 may determine the website to be safe.

Alternatively, or additionally, environment determination component 510 may analyze website lists 450 to determine whether the website is safe or unsafe. For example, if website lists 450 indicate that the website is listed on a blacklist included in website lists 450, environment determination component 510 may determine the website to be unsafe. If website lists 450 indicate that the website is listed on a whitelist included in website lists 450, environment determination component 510 may determine the website to be safe.

Alternatively, or additionally, environment determination component 510 may analyze the results of the determinations made with respect to the information associated with website connection 420, website information 430, and website lists 450, and may determine whether the website is safe or unsafe based upon the analysis.

As further shown in FIG. 5, if environment determination component 510 determines that the website is unsafe, environment determination component 510 may provide, to warning generation component 520, an indication 550 that the website constitutes an unsafe environment. If environment determination component 510 determines that the website is safe, environment determination component 510 may provide, to warning generation component 520, an indication 560 that the website constitutes a safe environment.

Warning generation component 520 may receive sensitive information indication 530 or no sensitive information indication 540 from sensitive information determination component 500, and may receive unsafe environment indication 550 or safe environment indication 560 from environment determination component 510. As further shown in FIG. 5, warning generation component 520 may receive, from user 410, a request 590 to submit information 440 to online provider 220. Warning generation component 520 may respond to request 590 in a number of ways depending upon the indications received from sensitive information determination component 500 and environment determination component 510. For example, if warning generation component 520 receives sensitive information indication 530 and safe environment indication 560, warning generation component 520 may provide information 440 to online provider 220. If warning generation component 520 receives sensitive information indication 530 and unsafe environment indication 550, warning generation component 520 may provide warning 460 to user 410 and/or may prevent information 440 from being provided to online provider 220. If warning generation component 520 receives no sensitive information indication 540 and either unsafe environment indication 550 or safe environment indication 560, warning generation component 520 may provide information 440 to online provider 220.

Although FIG. 5 shows example functional components of browser 215, in other implementations, browser 215 may include fewer functional components, different functional components, differently arranged functional components, or additional functional components than depicted in FIG. 5. Additionally, or alternatively, one or more functional components of browser 215 may perform one or more other tasks described as being performed by one or more other functional components of browser 215.

Example Browser Generated User Interfaces

Figure 6:
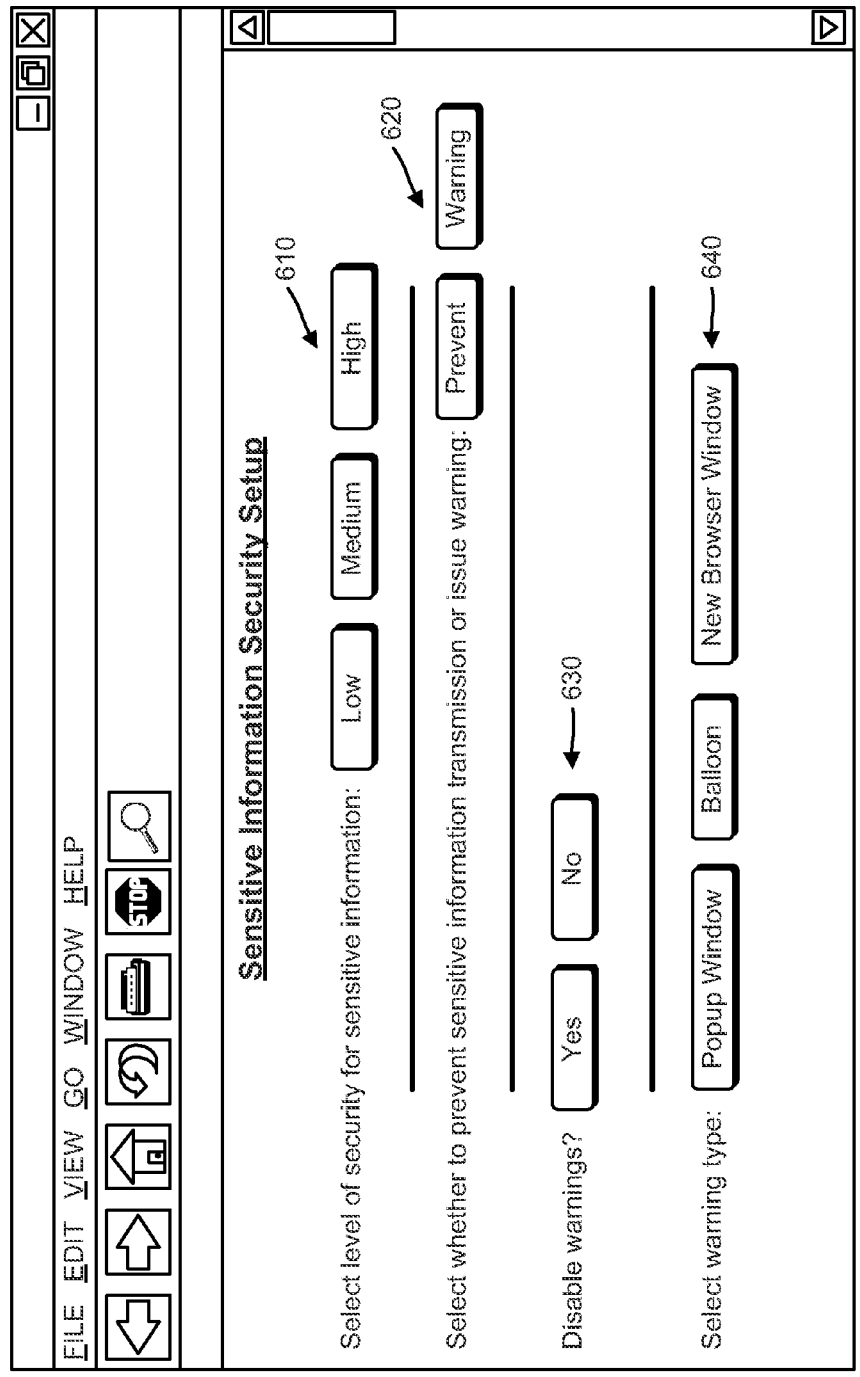
FIGS. 6-8 are diagrams of example user interfaces capable of being generated or provided by the client device via the browser.
Figure 7:
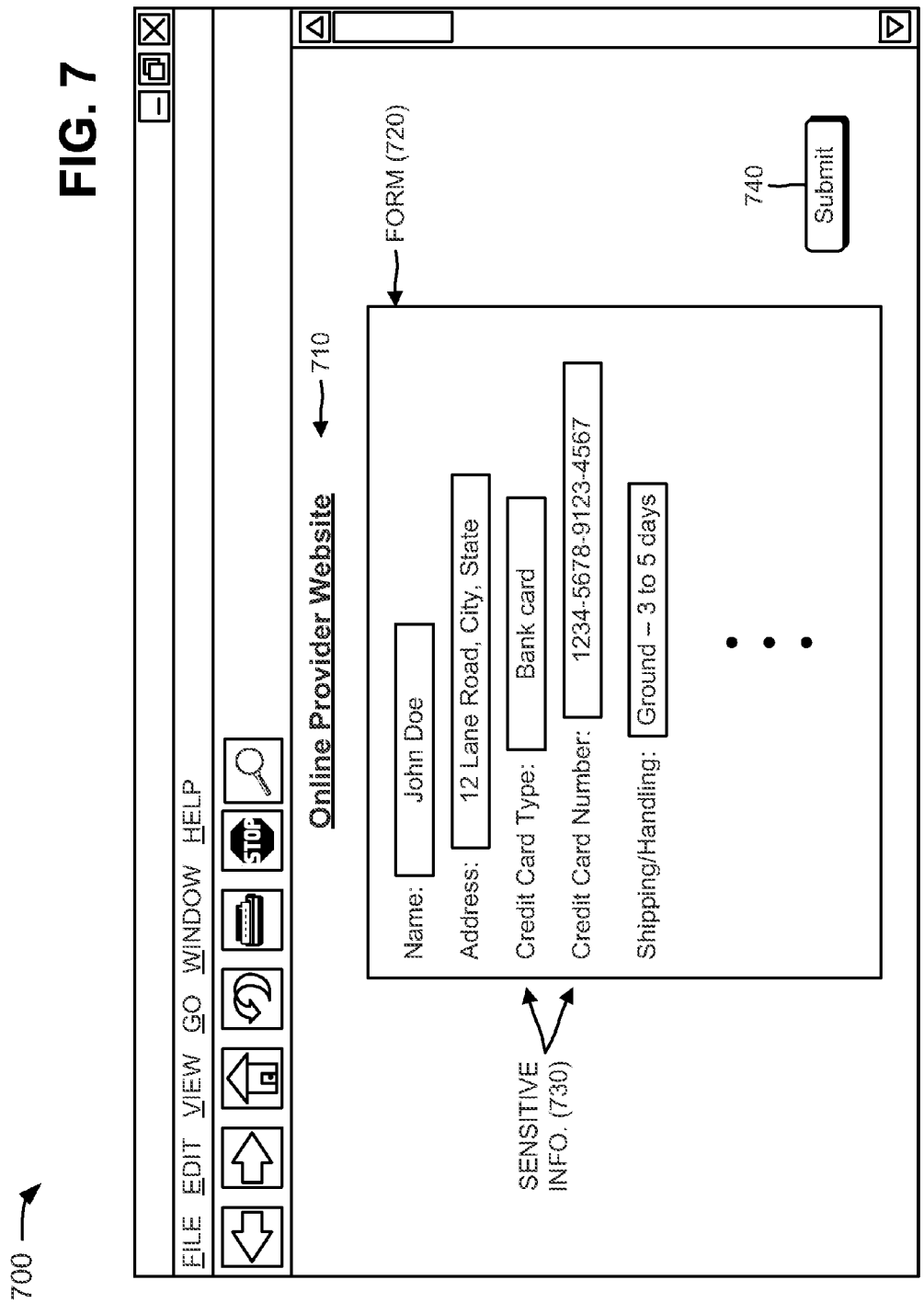
Figure 8:
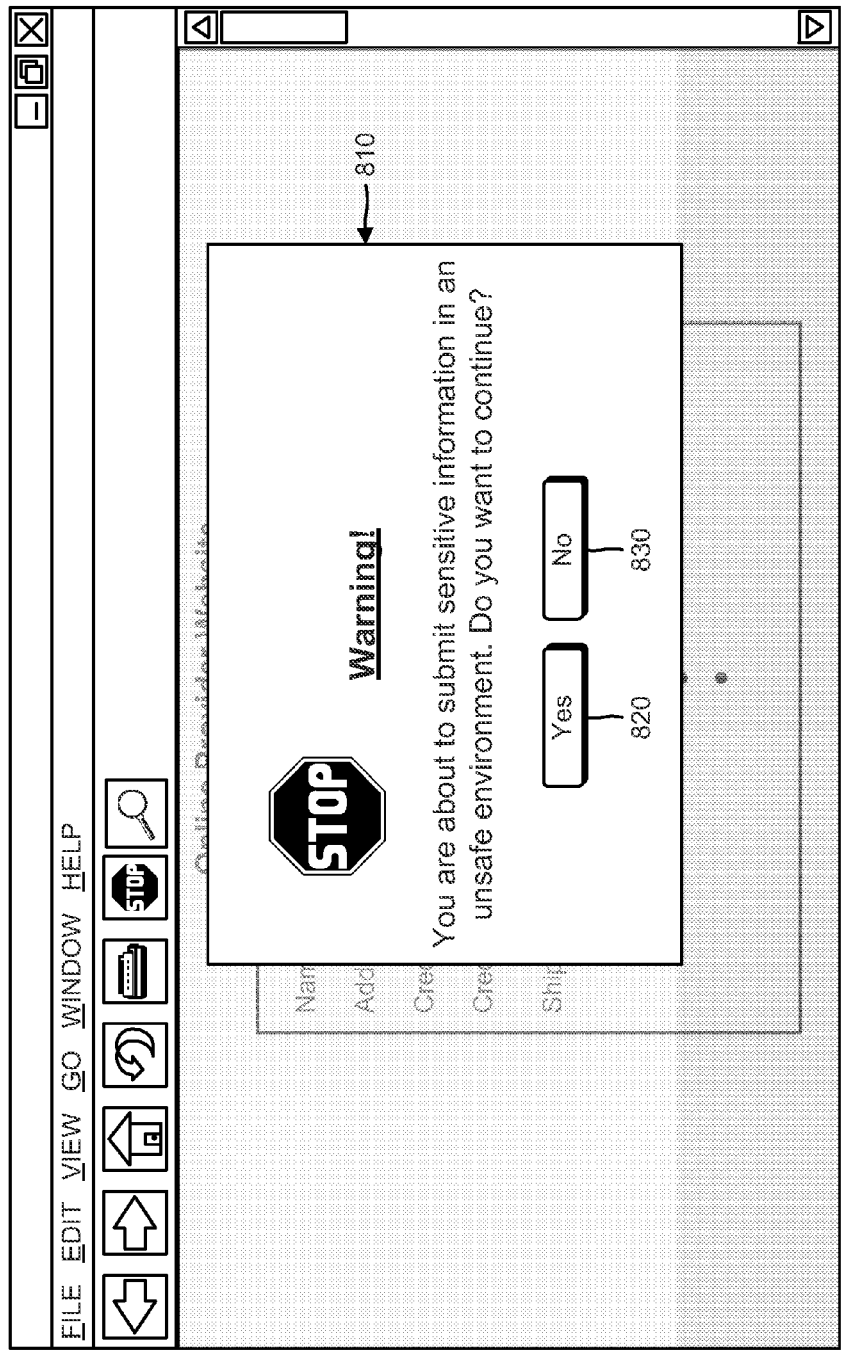

FIGS. 6-8 are diagrams of example user interfaces 600-800 capable of being generated or provided by client device 210 via browser 215. User interfaces 600-800 depicted in FIGS. 6-8, respectively, as well as user interfaces 1100-1800 depicted in FIGS. 11-18, respectively, (hereinafter referred to collectively as "the user interfaces") may include graphical user interfaces (GUIs) or non-graphical user interfaces, such as text-based interfaces. The user interfaces may provide information to users via browser-based interfaces and/or via customized interfaces (e.g., proprietary interfaces). The user interfaces may receive user inputs via one or more input devices, may be user-configurable (e.g., a user may change the size of the user interfaces, information displayed in the user interfaces, color schemes used by the user interfaces, positions of text, images, icons, windows, etc., in the user interfaces, etc.), or may not be user-configurable. Information associated with the user interfaces may be selected and/or manipulated by a user of client device 210, via, for example, a touch screen display, a mouse, a keyboard, a remote control, etc.

As shown in FIG. 6, user interface 600 may provide information that a user may manipulate to configure security settings for sensitive information. For example, user interface 600 may enable the user to set a security level for sensitive information, as indicated by reference number 610. The security level may be set to low, medium, or high (or using some other type of level designation) by the user, and the set security level may alter the functionality of sensitive information determination component 500 (FIG. 5). For example, a low security level may cause sensitive information determination component 500 to consider a user's name, address, and telephone number as not sensitive. A medium security level may cause sensitive information determination component 500 to consider the user's name as not sensitive but to consider the address and the telephone number as sensitive. A high security level may cause sensitive information determination component 500 to consider the user's name, address, and telephone number as sensitive.

User interface 600 may enable the user to set whether the user wants browser 215 to prevent transmission of sensitive information, issue a warning about sensitive information before transmission, or perform both operations, as indicated by reference number 620. For example, if the user selects the "Prevent" button and browser 215 determines that the user wants to provide sensitive information to online provider 220, browser 215 may prevent client device 210 from providing the sensitive information to online provider 220. If the user selects the "Warning" button and browser 215 determines that the user wants to provide sensitive information to online provider 220, browser 215 may provide warning 460 (FIG. 4) to the user.

As further shown in FIG. 6, user interface 600 may enable the user to prevent browser 215 from issuing warnings (e.g., warning 460) when browser 215 determines that the user wants to provide sensitive information to online provider 220, as indicated by reference number 630. For example, if the user selects the "Yes" button and browser 215 determines that the user wants to provide sensitive information to online provider 220, browser 215 may not provide warning 460 to the user. If the user selects the "No" button and browser 215 determines that the user wants to provide sensitive information to online provider 220, browser 215 may provide warning 460 to the user. As indicated by reference number 640, user interface 600 also may enable the user to select a type of warning 460, such as, for example, a popup window, a balloon, a new browser window, etc.

As shown in FIG. 7, user interface 700 may include a website 710 provided by online provider 220 to browser 215. In one example, website 710 may be generated by browser 215 based on website information 430 received from online provider 220. As further shown, website 710 may provide an online form 720 that requests information from the user, such as a name, an address, a credit card type, a credit card number, shipping and handling information, etc. associated with the user. The user may input the information requested by online form 720, and browser 215 may automatically determine whether the provided information contains any sensitive information. Browser 215 may make this determination in the manner described above in connection with FIGS. 4 and 5. In one example, as shown in FIG. 7, browser 215 may determine that the credit card type and the credit card number constitute sensitive information 730.

Browser 215 may also determine whether website 710 is safe or unsafe in the manner described above in connection with FIGS. 4 and 5. In this example, it may be assumed that browser 215 determined that website 710 is unsafe. The user may utilize a selection mechanism, such as a submit button 740, to transmit the information provided in online form 720 to online provider 220. However, since browser 215 determined that sensitive information 730 is provided in online form 720 and that website 710 is unsafe, browser 215 may generate user interface 800 of FIG. 8 before transmitting the information provided in online form 720 to online provider 220.

As shown in FIG. 8, user interface 800 may include a warning window 810 that warns the user that sensitive information 730 is about to be transmitted in an unsafe environment (e.g., website 710) to online provider 220. Warning window 810 may also ask whether the user wants to continue and provide the information from online form 720, including sensitive information 730, to online provider 220. If the user selects a "Yes" button 820, the user may effectively ignore warning window 810, and browser 215 may provide the information from online form 720, including sensitive information 730, to online provider 220. If the user selects a "No" button 830, the user may effectively heed warning window 810, and browser 215 may not provide the information from online form 720, including sensitive information 730, to online provider 220.

Although user interfaces 600-800 of FIGS. 6-8 depict a variety of information, in other implementations, user interfaces 600-800 may depict less information, different information, differently arranged information, or additional information than depicted in FIGS. 6-8.

Figure 9:
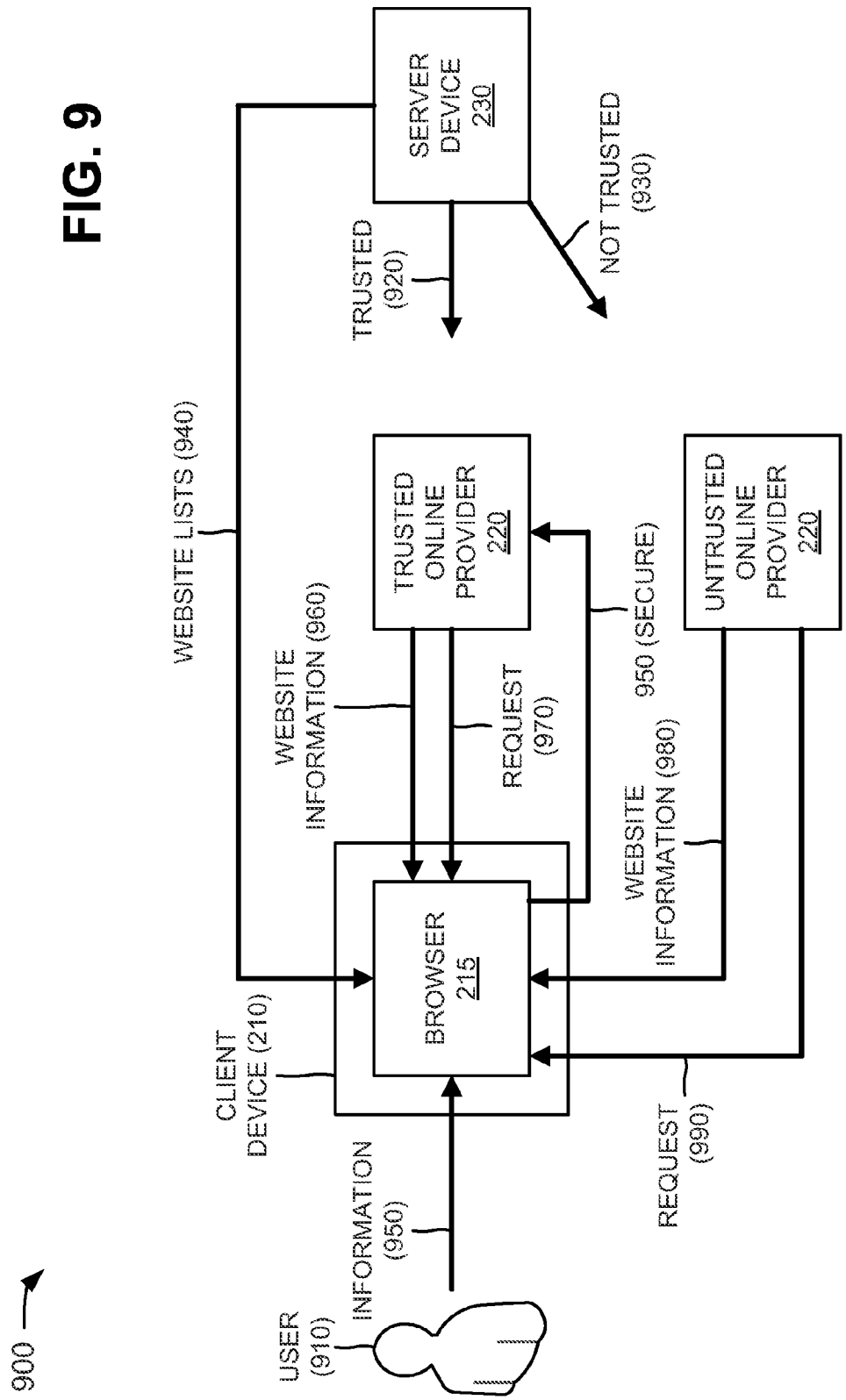
FIG. 9 is a diagram of example operations capable of being performed by another example portion of the network.

Example Operations for Storing Sensitive
Information to Increase Trust in Online Information
Exchange FIG. 9 is a diagram of example operations capable of being performed by another example portion 900 of network 200 (FIG. 2). As shown, network portion 900 may include client device 210, browser 215, a trusted online provider 220, an untrusted online provider 220, and server device 230. Client device 210, browser 215, online providers 220, and server device 230 may include the features described above in connection with, for example, one or more of FIGS. 2-8.

As further shown in FIG. 9, a user 910 may be associated with client device 210, and may interact with client device 210 via browser 215. Server device 230 may perform a formal certification process of websites provided by online providers 220 to determine whether the websites and/or online providers 220 are trusted (i.e., safe) or untrusted (i.e., unsafe) online providers 220. For example, server device 230 may determine that a website provided by trusted online provider 220 is on one or more whitelists, is not on one or more blacklists, etc., and may determine that the website and/or trusted online provider 220 are trusted, as indicated by reference number 920. Alternatively, or additionally, server device 230 may determine that a website provided by untrusted online provider 220 is not on one or more whitelists, is on one or more blacklists, etc., and may determine that the website and/or trusted online provider 220 are untrusted, as indicated by reference number 930. Based on the formal certification process, server device 230 may periodically and automatically provide website lists 940 to browser 215, or in response to browser 215 requesting website lists 940. Website lists 940 may include one or more lists of untrusted websites provided by online providers 220, one or more lists of trusted websites provided by online providers 220, and/or other information that may provide an indication of a trustworthiness or untrustworthiness of the websites and/or online providers 220.

As further shown in FIG. 9, user 910 may provide information 950 to browser 215, and browser 215 may receive information 950. Information 950 may include information that may be automatically provided to trusted online provider 220 when requested by trusted online provider 220. For example, information 950 may include a name, an address, credit card information, etc., associated with user 910, that online provider 220 may request in order to complete an online transaction (e.g., a purchase of merchandise or a service). Browser 215 may determine whether information 950 contains any sensitive information, such as a credit card number, a social security number, a password, a PIN, a driver's license number, etc. Further details of how browser 215 makes this determination are provided below in connection with FIG. 10. Browser 215 may store the sensitive information contained in information 950 when browser 215 determines that information 950 includes sensitive information. Alternatively, or additionally, browser 215 may store information 950 regardless of whether browser 215 determines that information 950 includes sensitive information.

Browser 215 and trusted online provider 220 may establish a website connection with each other so that trusted online provider 220 may display a website to user 910, via browser 215. Trusted online provider 220 may provide website information 960 to browser 215. Browser 215 may receive website information 960, and may display website information 960 to user 910, via a display of client device 210. Website information 960 may include information associated with the website provided by trusted online provider 220 to browser 215. For example, if trusted online provider 220 is an online pharmacy, website information 960 may include information associated with products offered for sale by the online pharmacy. Website information 960 may also include website connection information, such as information identifying whether the website connection is a secure connection, a broken connection, or an unsecure connection; information identifying whether encryption associated with the website connection is current or outdated; information identifying whether a certificate associated with the website connection is trusted or untrusted (e.g., invalid, expired, self signed by trusted online provider 220, etc.); etc.

In one example, user 910 may utilize the website provided by trusted online provider 220 to order a product or a service from trusted online provider 220. As further shown in FIG. 9, and in order to complete the order of the product or service, trusted online provider 220 may provide a request 970 to browser 215, and browser 215 may receive request 970. Request 970 may include a request for information 950 stored by browser 215, such as a request for the sensitive information included in information 950. In one example, request 970 may include an API call that may be used to establish a secure (e.g., encrypted) communication channel between browser 215 and trusted online provider 220.

Prior to providing information 950 to trusted online provider 220, in response to request 970, browser 215 may determine whether the website provided by trusted online provider 220 is trusted or untrusted based on website information 960 and/or website lists 940. Further details of how browser 215 makes this determination are provided below in connection with FIG. 10. In one example, browser 215 may determine that the website provided by trusted online provider 220 is trusted. Thus, browser 215 may provide information 950, including the sensitive information, to trusted online provider 220 in a secure manner, such as via the trusted communication channel established with trusted online provider 220.

Browser 215 and untrusted online provider 220 may establish a website connection with each other so that untrusted online provider 220 may display a website to user 910, via browser 215. Untrusted online provider 220 may provide website information 980 to browser 215. Browser 215 may receive website information 980, and may display website information 980 to user 910, via a display of client device 210. Website information 980 may include information associated with the website provided by untrusted online provider 220 to browser 215. Website information 980 may also include website connection information, such as information identifying whether the website connection is a secure connection, a broken connection, or an unsecure connection; information identifying whether encryption associated with the website connection is current or outdated; information identifying whether a certificate associated with the website connection is trusted or untrusted; etc.

In one example, user 910 may utilize the website provided by untrusted online provider 220 to purchase merchandise from untrusted online provider 220. As further shown in FIG. 9, and in order to complete the merchandise purchase, untrusted online provider 220 may provide a request 990 to browser 215, and browser 215 may receive request 990. Request 990 may include a request for information 950 stored by browser 215, such as a request for the sensitive information included in information 950.

Prior to providing information 950 to untrusted online provider 220, in response to request 990, browser 215 may determine whether the website provided by untrusted online provider 220 is trusted or untrusted based on website information 980 and/or website lists 940. In one example, browser 215 may determine that the website provided by untrusted online provider 220 is untrusted, and may display, to user 910, a warning that indicates that the website is untrusted. User 910 may heed the warning and elect to not provide information 950 to untrusted online provider 220, or may ignore the warning and elect to provide information 950 to untrusted online provider 220. Alternatively, or additionally, browser 215 may prevent information 950 from being provided to untrusted online provider 220 when information 950 contains sensitive information and the website is untrusted.

The arrangement depicted in FIG. 9 may enable browser 215 to mediate access to sensitive information stored by browser 215, which may provide for a more sophisticated disclosure of the sensitive information. Browser 215 may provide the sensitive information to trusted online providers 220 via a secure communication channel to ensure that the sensitive information is adequately protected and to guarantee to user 910 the safety of the sensitive information transmission. In one example implementation, browser 215 may not prevent user 910 from performing online transactions in a traditional manner, such as via manual provision of a name, a mailing address, credit card information, etc. Rather, the functionality of browser 215 described herein may be utilized in conjunction with the traditional mechanisms used for performing online transactions.

Unlike online payment verification systems (e.g., PayPal™) which seek to protect users from untrustworthy websites, the functionality of browser 215 described herein may actually identify the untrustworthy websites to the users and may prevent the users from interacting with the untrustworthy websites. However, browser 215 may interface with such payment verification systems in order to obtain the sensitive information associated with user 910.

Although FIG. 9 shows example components of network portion 900, in other implementations, network portion 900 may include fewer components, different components, differently arranged components, or additional components than depicted in FIG. 9. Additionally, or alternatively, one or more components of network portion 900 may perform one or more other tasks described as being performed by one or more other components of network portion 900.

Further Example Browser Functional Components

Figure 10:
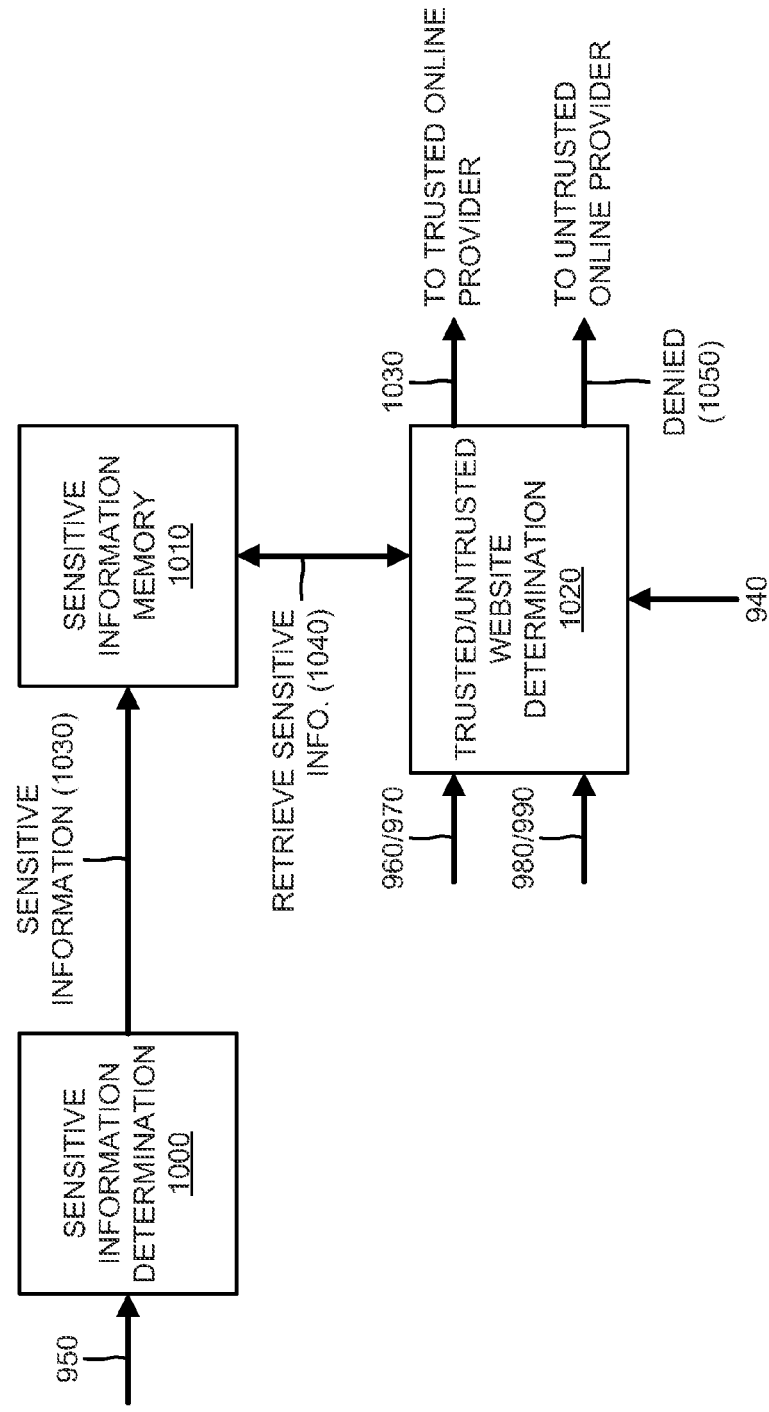
FIG. 10 is a diagram of further example functional components of the browser.

FIG. 10 is a diagram of further example functional components of browser 215. In one implementation, the functions described in connection with FIG. 10 may be performed by one or more components of device 300/350 (FIG. 3) or by one or more devices 300/350. As shown in FIG. 10, browser 215 may include a sensitive information determination component 1000, a sensitive information memory 1010, and a trusted/untrusted website determination component 1020.

Sensitive information determination component 1000 may receive information 950 and may determine whether information 950 contains sensitive information 1030. Sensitive information 1030 may include information that, if made public to an untrustworthy website, may compromise the user's financial accounts, identity, etc. For example, sensitive information 1030 may include personal information of user 910, financial information of user 910, medical information of user 910, online payment verification system information of user 910, and/or other information associated with user 910.

Sensitive information determination component 1000 may include the features of sensitive information determination component 500 (FIG. 5). Thus, sensitive information determiner 100 may determine whether information 950 contains sensitive information 1030 by utilizing pattern recognition techniques, heuristic recognition techniques, etc. As further shown in FIG. 10, sensitive information determination component 1000 may provide sensitive information 1030 to sensitive information memory 1010 for storage. Alternatively, or additionally, sensitive information determination component 1000 may provide information 950 to sensitive information memory 1010 for storage, although not shown in FIG. 10.

Sensitive information memory 1010 may include one or more storage devices that may store information received by and/or provided to browser 215. For example, sensitive information memory 1010 may receive and store information 950 and/or sensitive information 1030.

Trusted/untrusted website determination component 1020 may receive website lists 940, website information 960, and request 970, and may determine whether the website provided by trusted online provider 220 is trusted or untrusted based on the received information. Trusted/untrusted website determination component 1020 may determine whether the website is trusted or untrusted in a variety of ways. In one example implementation, trusted/untrusted website determination component 1020 may analyze website lists 940 to determine whether the website is trusted or untrusted. For example, if website lists 940 indicate that the website is listed on a blacklist included in website lists 940, trusted/untrusted website determination component 1020 may determine the website to be untrusted. If website lists 940 indicate that the website is listed on a whitelist included in website lists 940, trusted/untrusted website determination component 1020 may determine the website to be trusted.

Alternatively, or additionally, trusted/untrusted website determination component 1020 may analyze website information 960 to determine whether the website is trusted or untrusted. For example, if website information 960 indicates that encryption associated with the website is outdated, trusted/untrusted website determination component 1020 may determine the website to be untrusted. If website information 960 indicates that the encryption associated with the website is current, trusted/untrusted website determination component 1020 may determine the website to be trusted. If website information 960 indicates that a certificate associated with the website is not trusted (e.g., invalid, expired, self signed, etc.), trusted/untrusted website determination component 1020 may determine the website to be untrusted. If website information 960 indicates that the certificate associated with the website is valid and trusted, trusted/untrusted website determination component 1020 may determine the website to be trusted.

Alternatively, or additionally, trusted/untrusted website determination component 1020 may analyze the website connection information (e.g., provided in website information 960) to determine whether the website is trusted or untrusted. For example, if the website connection information indicates that the website connection is not a secure connection, trusted/untrusted website determination component 1020 may determine the website to be untrusted. If the website connection information indicates that the website connection is a secure connection, trusted/untrusted website determination component 1020 may determine the website to be trusted. If the website connection information indicates that the website connection is a secure connection but that the secure connection is broken, trusted/untrusted website determination component 1020 may determine the website to be untrusted.

Alternatively, or additionally, trusted/untrusted website determination component 1020 may analyze the results of the determinations made with respect to website lists 940, website information 960, and the website connection information, and may determine whether the website is trusted or untrusted based upon the analysis.

As further shown in FIG. 10, trusted/untrusted website determination component 1020 may receive website information 980 and request 990, and may determine whether the website provided by untrusted online provider 220 is trusted or untrusted based on website lists 940, website information 960, and the website connection information provided in website information 960. In one example implementation, trusted/untrusted website determination component 1020 may determine whether the website provided by untrusted online provider 220 is trusted or untrusted in a similar manner as described above for the website provided by trusted online provider 220.

In one example, trusted/untrusted website determination component 1020 may determine that trusted online provider 220 provides a trusted environment, and may determine that untrusted online provider 220 does not provide a trusted environment. Accordingly, trusted/untrusted website determination component 1020 may retrieve sensitive information 1030 from sensitive information memory 1010, as indicated by reference number 1040, and may provide sensitive information 1030 to trusted online provider 220. Trusted/untrusted website determination component 1020 may not provide sensitive information 1030 to untrusted online provider 220, but instead may provide, to untrusted online provider 220, an indication 1050 that request 990 is denied. Alternatively, or additionally, trusted/untrusted website determination component 1020 may display, to user 910, a warning that indicates that the website provided by untrusted online provider 220 is untrusted. User 910 may heed the warning and elect to not provide sensitive information 1030 to untrusted online provider 220, or may ignore the warning and elect to provide sensitive information 1030 to untrusted online provider 220.

Although FIG. 10 shows example functional components of browser 215, in other implementations, browser 215 may include fewer functional components, different functional components, differently arranged functional components, or additional functional components than depicted in FIG. 10. Additionally, or alternatively, one or more functional components of browser 215 may perform one or more other tasks described as being performed by one or more other functional components of browser 215.

Additional Example Browser Generated User Interfaces

FIGS. 11-18 are diagrams of additional example user interfaces 1100-1800 capable of being generated or provided by client device 210 via browser 215. As shown in FIG. 11, user interface 1100 may enable a user to input information, associated with the user, which may be stored by browser 215. For example, user interface 1100 may request a name and mailing address of the user, as indicated by reference number 1110, credit card information 1120 associated with the user, a social security number 1130 of the user, etc. Credit card information 1120 may include credit card type information, a credit card number, a CVV number, and an expiration date of the credit card. The information provided by the user, via user interface 1100, may include sensitive information and/or non-sensitive information, as described herein. Browser 215 may receive the information provided via user interface 1100, and may store the information (e.g., in sensitive information memory 1010, FIG. 10).

Figure 12:
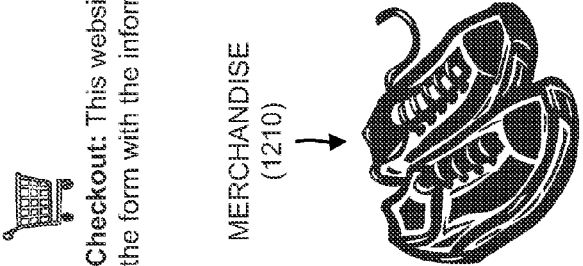

As shown in FIG. 12, user interface 1200 may include a website provided by trusted online provider 220 to browser 215. In one example, the website may be generated by browser 215 based on website information 960 received from trusted online provider 220. As further shown, the website may provide information associated with merchandise 1210 to be purchased from trusted online provider 220. Browser 215 may display information 1220 that indicates that the website is trusted and secure. Information 1220 may also request the user to determine whether to automatically populate an online form 1230 provided by the website. Online form 1230, for example, may request information from the user, such as a name, an address, a credit card type, a credit card number, shipping and handling information, etc. associated with the user. If the user elects to automatically populate online form 1230 (e.g., via selection of a "Yes" button), browser 215 may retrieve the information requested by online form 1230 from sensitive information memory 1010 (FIG. 10), and may automatically populate online form 1230. The user may utilize a selection mechanism, such as a submit button 1240, to transmit the information provided in online form 1230 to trusted online provider 220.

As shown in FIG. 13, user interface 1300 may include a job application of a website provided by trusted online provider 220 to browser 215. In one example, the website may be generated by browser 215 based on website information 960 received from trusted online provider 220. As further shown, browser 215 may display information 1310 that indicates that the website is trusted and secure. Information 1310 may also request the user to determine whether to automatically populate an online job application form 1320 provided by the website. Online job application form 1320, for example, may request information from the user, such as a name, an address, a social security number, a tax ID, etc. associated with the user. If the user elects to automatically populate online job application form 1320 (e.g., via selection of a "Yes" button), browser 215 may retrieve the information requested by online job application form 1320 from sensitive information memory 1010 (FIG. 10), and may automatically populate online job application form 1320. The user may utilize a selection mechanism, such as a submit button 1330, to transmit the job application information provided in online form 1320 to trusted online provider 220.

Figure 14:
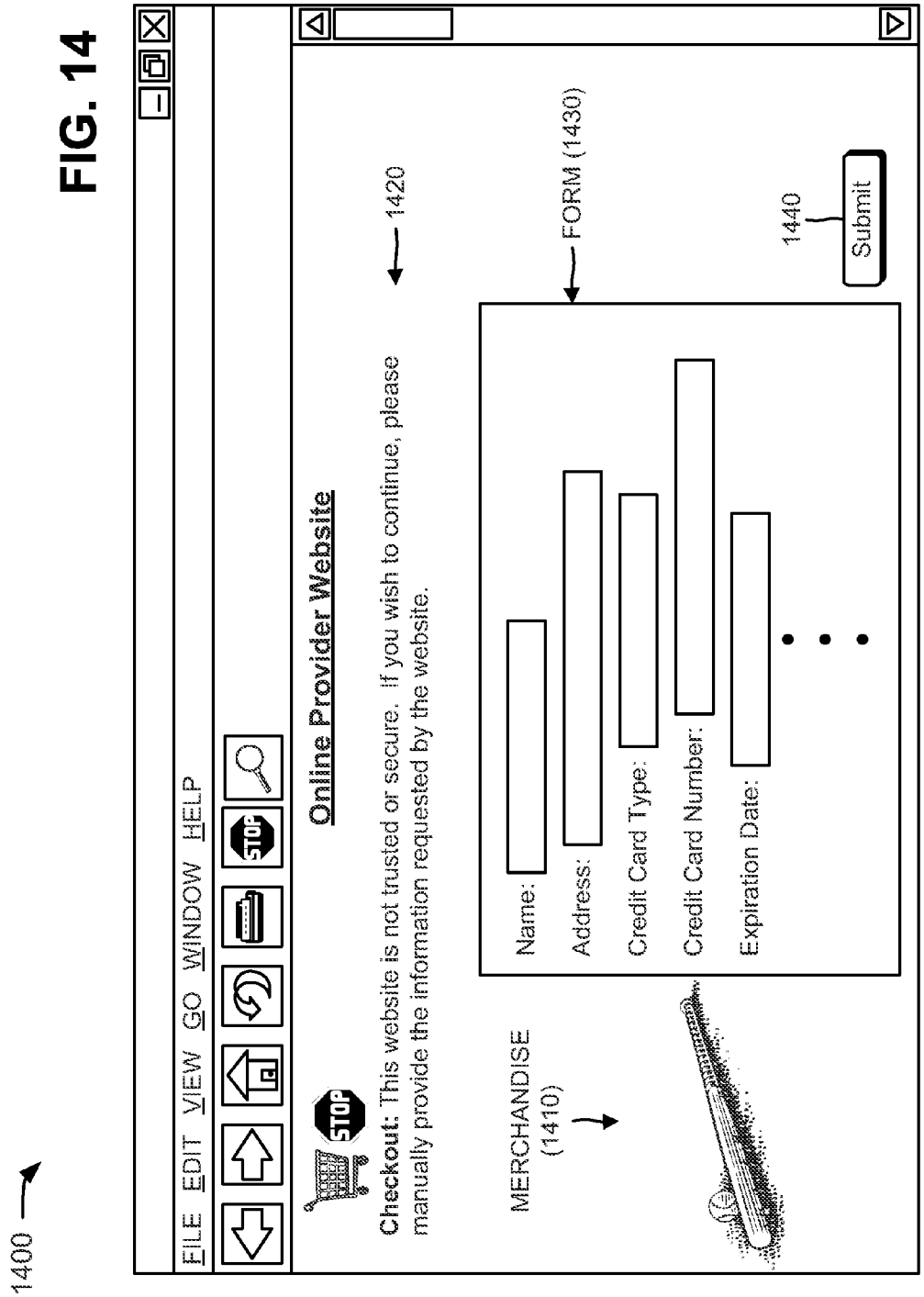

As shown in FIG. 14, user interface 1400 may include a website provided by untrusted online provider 220 to browser 215. In one example, the website may be generated by browser 215 based on website information 980 received from untrusted online provider 220. As further shown, the website may provide information associated with merchandise 1410 to be purchased from untrusted online provider 220. Browser 215 may display a warning 1420 that indicates that the website is not trusted or secure. Warning 1420 may also indicate that if the user wishes to continue, the user must manually provide the information requested by an online form 1430 provided by the website. Online form 1430, for example, may request information from the user, such as a name, an address, a credit card type, a credit card number, an expiration date of the credit card, etc. associated with the user. If the user ignores warning 1420 and manually enters the information requested by online form 1430, the user may utilize a selection mechanism, such as a submit button 1440, to transmit the information provided in online form 1430 to untrusted online provider 220.

Figure 15:
Figure 16:
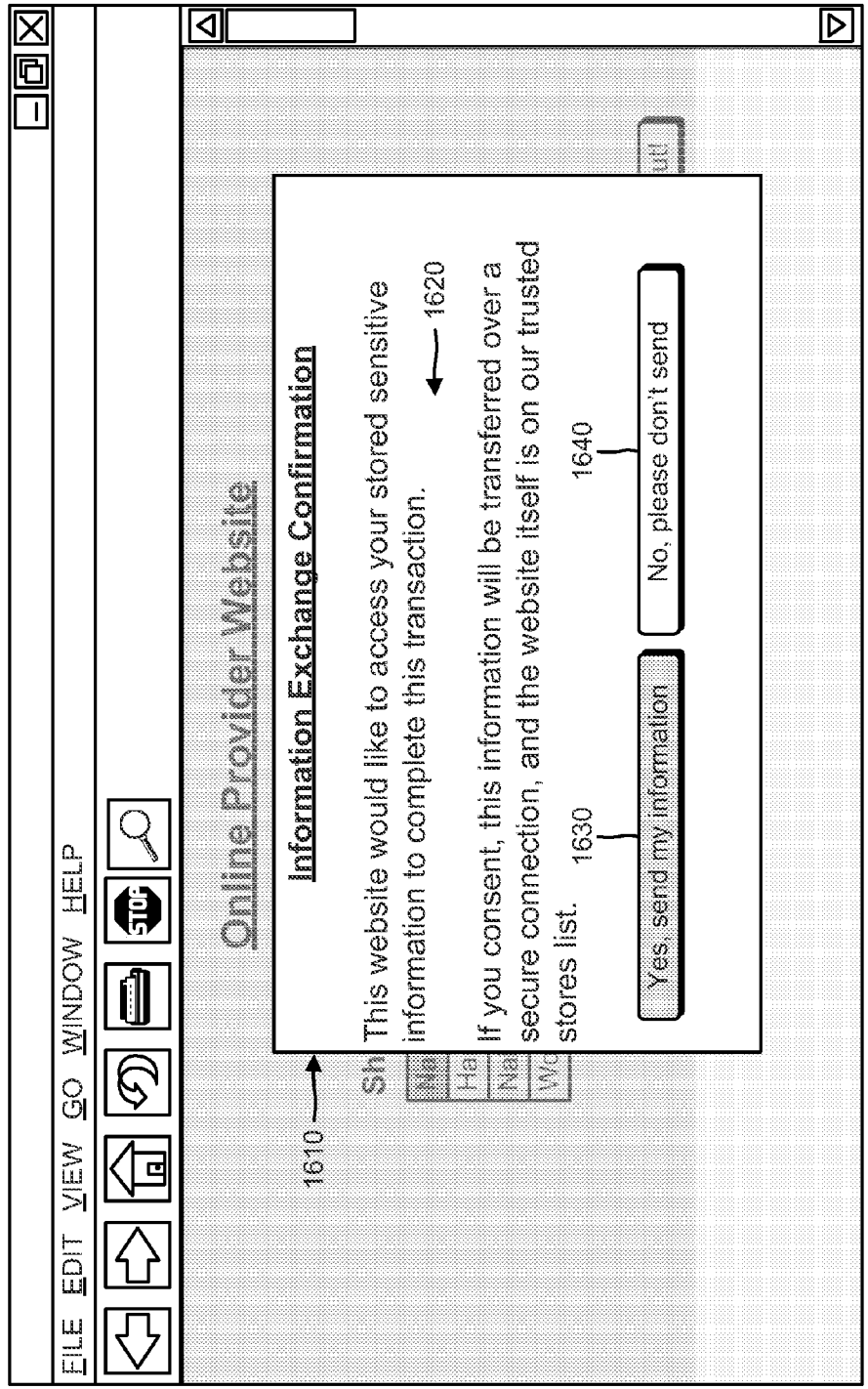
Figure 17:
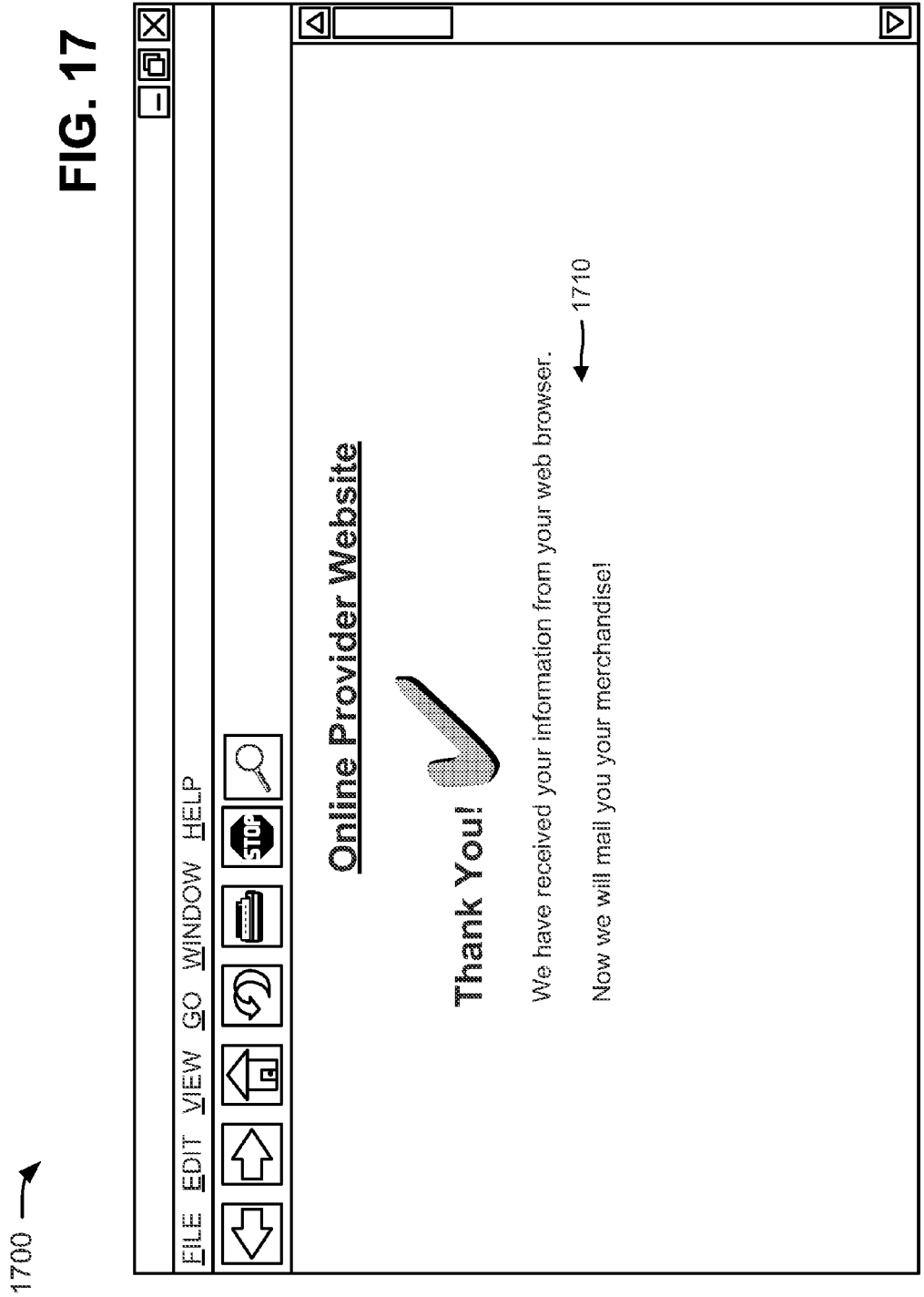

As shown in FIG. 15, user interface 1500 may include a website provided by trusted online provider 220 to browser 215. In one example, the website may be generated by browser 215 based on website information 960 received from trusted online provider 220. As further shown, the website may provide a shopping cart 1510 that includes information associated with goods (e.g., a hammer for $10.00, nails for $5.00, etc.) to be purchased from trusted online provider 220 by the user. The website may also provide a selection mechanism, such as a checkout button 1520, which enables the user to complete the purchase of the goods provided in shopping cart 1510.

When the user selects checkout button 1520, trusted online provider 220 may provide request 970 to browser 215, and browser 215 may receive request 970. Request 970 may include a request for information 950 stored by browser 215, such as a request for the sensitive information included in information 950. Prior to providing information 950 to trusted online provider 220, in response to request 970, browser 215 may determine whether the website provided by trusted online provider 220 is trusted or untrusted based on website information 960 and/or website lists 940. In one example, browser 215 may determine that the website provided by trusted online provider 220 is trusted, and may display an information exchange confirmation window 1610 to the user, as shown in user interface 1600 of FIG. 16.

Information exchange confirmation window 1610 may indicate that the website would like to access information 950 stored by browser 215, as indicated by reference number 1620. As further shown by reference number 1620, information exchange confirmation window 1610 may indicate that if the user consents, information 950 may be transferred to trusted online provider 220 over a secure connection, and that the website is on a trusted stores list. The user may elect to send information 950 to trusted online provider 220 via a selection mechanism 1630 (e.g., a button that states "Yes, send my information"). Alternatively, the user may elect not to send information 950 to trusted online provider 220 via another selection mechanism 1640 (e.g., a button that states "No, please don't send").

If the user elects to send information 950 to trusted online provider 220, via selection of mechanism 1630, browser 215 may retrieve information 950 from sensitive information memory 1010 (FIG. 10), and may provide information to trusted online provider 220 via the secure connection. Trusted online provider 220 may receive information 950, and may complete the transaction. After the transaction is complete, the website may display user interface 1700 depicted in FIG. 17, via browser 215. As shown, user interface 1700 may indicate that information 950 was received from browser 215, and that the goods provided in shopping cart 1510 (FIG. 15) will be mailed to the user, as indicated by reference number 1710.

Figure 18:
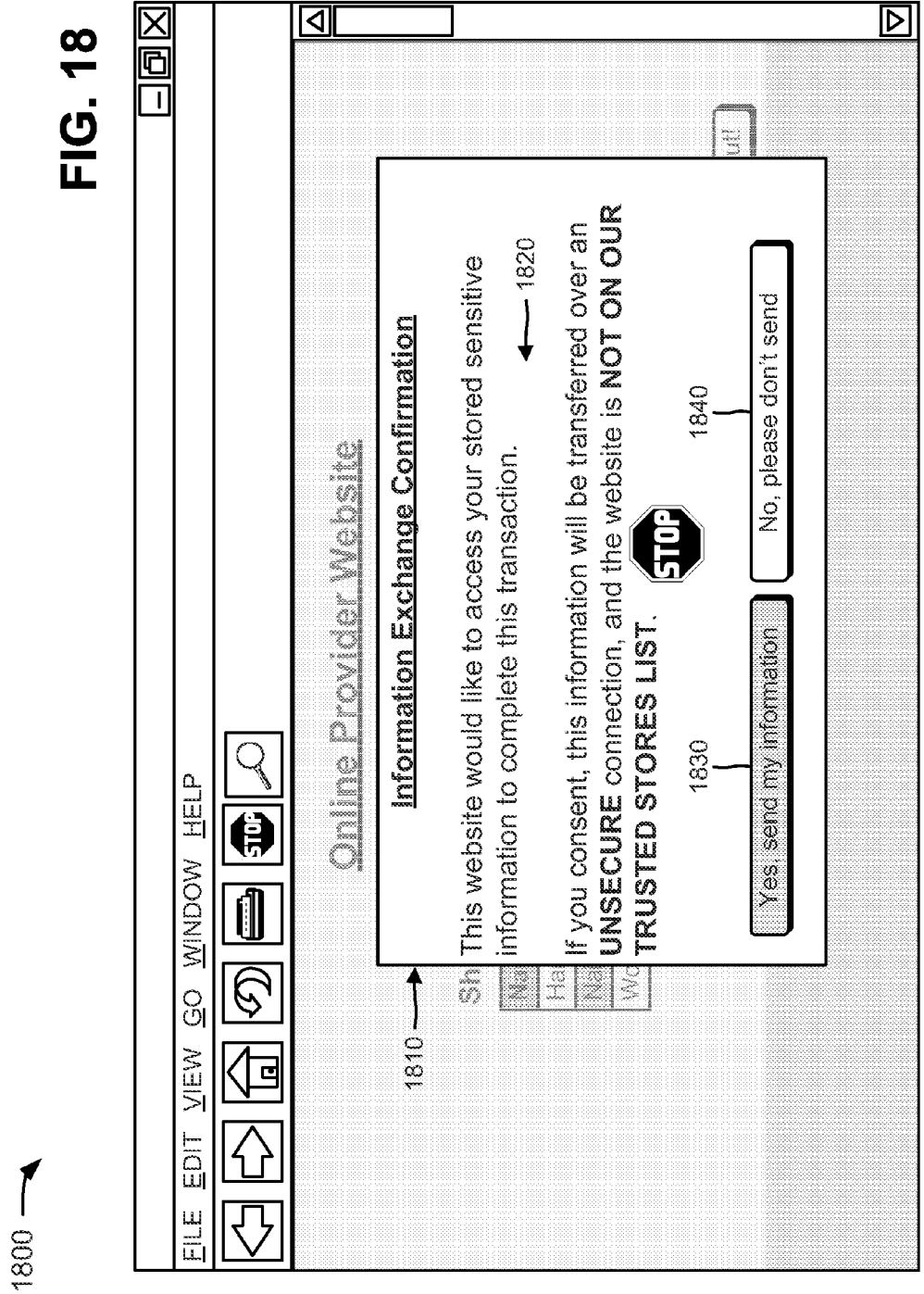

Alternatively, if the website depicted in FIG. 15 is provided by untrusted online provider 220 to browser 215, browser 215 may determine that the website is untrusted, and may display another information exchange confirmation window 1810 to the user, as shown in user interface 1800 of FIG. 18. Information exchange confirmation window 1810 may indicate that the website would like to access information 950 stored by browser 215, as indicated by reference number 1820. As further shown by reference number 1820, information exchange confirmation window 1810 may provide a warning that if the user consents, information 950 may be transferred to untrusted online provider 220 over an unsecure connection, and that the website is not on a trusted stores list. Despite the warning, the user may still elect to send information 950 to untrusted online provider 220 via a selection mechanism 1830 (e.g., a button that states "Yes, send my information"). Alternatively, the user may heed the warning and may elect not to send information 950 to untrusted online provider 220 via another selection mechanism 1840 (e.g., a button that states "No, please don't send").

Figure 19:
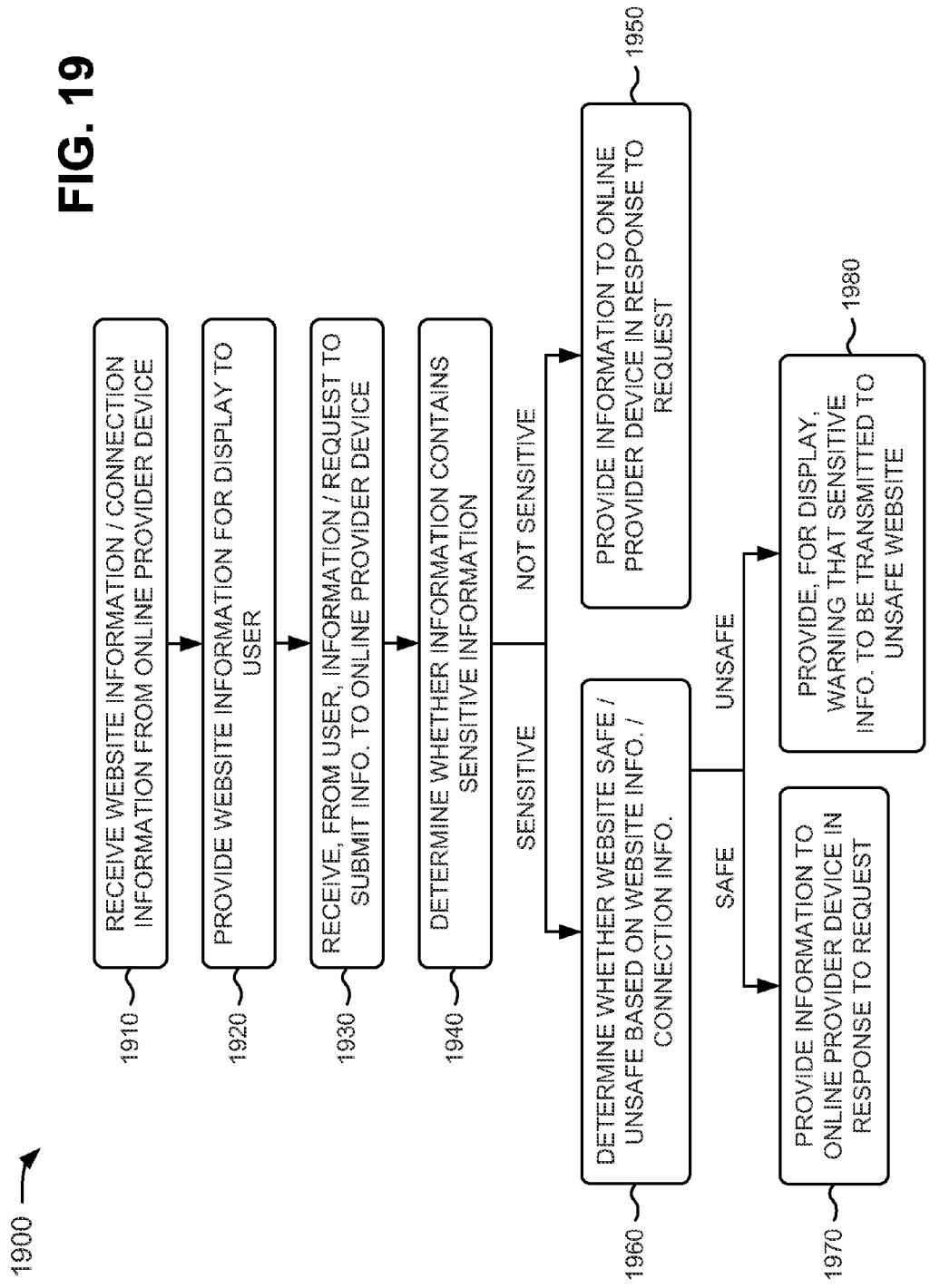
FIGS. 19-21 are flow charts of an example process for providing browser-based prevention of unsecure online transmission of sensitive information, according to an implementation described herein.
Figure 20:
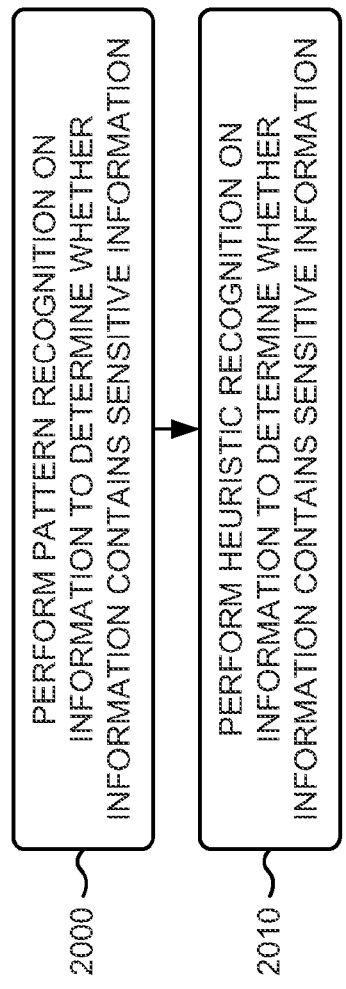
Figure 21:
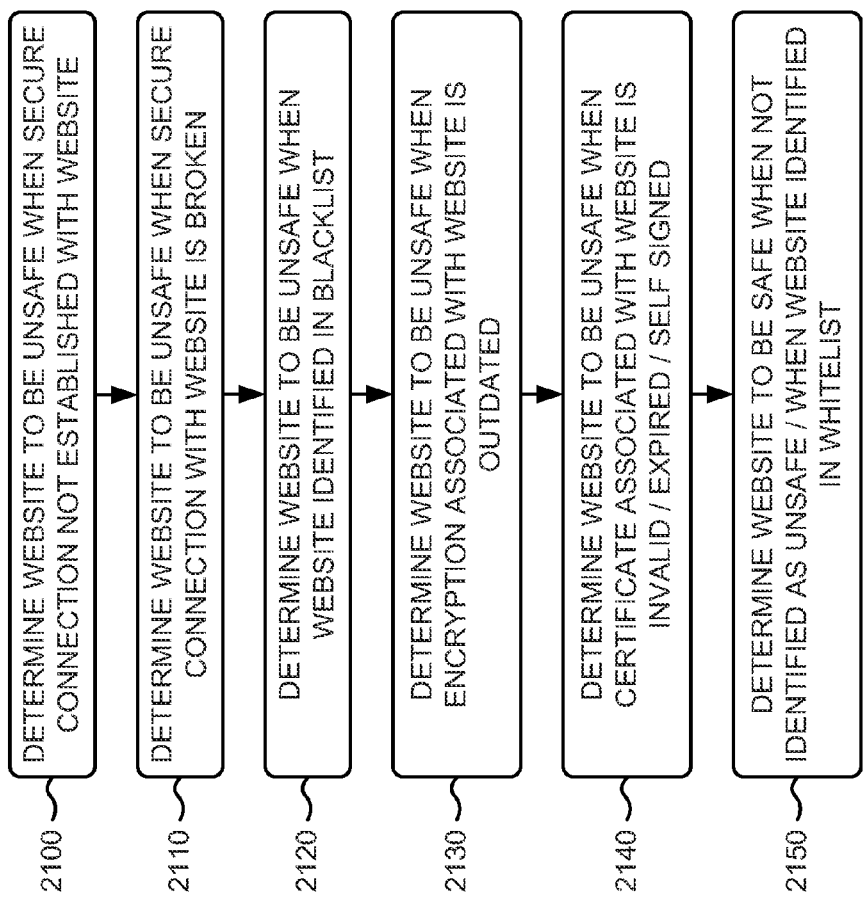

Example Process for Providing Browser-Based Prevention of Unsecure Online Transmission of Sensitive Information FIGS. 19-21 are flow charts of an example process 1900 for providing browser-based prevention of unsecure online transmission of sensitive information, according to an implementation described herein. In one implementation, process 1900 may be performed by client device 210 via browser 215. Alternatively, or additionally, some or all of process 1900 may be performed by another device or group of devices, including or excluding client device 210 and/or browser 215.

As shown in FIG. 19, process 1900 may include receiving information associated with a website and connection information from an online provider device (block 1910), and providing the website information for display to a user (block 1920). For example, in an implementation described above in connection with FIG. 4, browser 215 and online provider 220 may establish website connection 420 with each other so that online provider 220 may display a website to user 410, via browser 215. Information associated with website connection 420 may be provided to browser 215, and browser 215 may receive the information. The information associated with website connection 420 may include information identifying whether website connection 420 is a secure connection, a broken connection, or an unsecure connection; information identifying whether encryption associated with website connection 420 is current or outdated; information identifying whether a certificate associated with website connection 420 is trusted or untrusted; etc. Online provider 220 may provide website information 430 to browser 215. Browser 215 may receive website information 430, and may display website information 430 to user 410, via a display of client device 210. Website information 430 may include information associated with the website provided by online provider 220 to browser 215.

As further shown in FIG. 19, process 1900 may include receiving, from the user, information and a request to submit the information to the online provider device (block 1930), and determining whether the information contains sensitive information (block 1940). For example, in an implementation described above in connection with FIG. 4, user 410 may provide information 440 to browser 215, and browser 215 may receive information 440. Information 440 may include information requested by online provider 220 via the website provided by online provider 220. For example, information 440 may include a name, an address, credit card information, etc., associated with user 410, that online provider 220 requests in order to complete an online transaction (e.g., a purchase of merchandise). User 410 may request that information 440 be provided to online provider 220. For example, if user 410 entered information 440 into fields of the website provided by online provider 220, user 410 may request that the entered information 440 be provided to online provider 220 via a submit mechanism (e.g., a button, an icon, a link, etc.). Prior to providing information 440 to online provider 220, browser 215 may determine whether information 440 contains any sensitive information, such as a credit card number, a social security number, a password, a PIN, a driver's license number, etc.

Returning to FIG. 19, if the information does not contain sensitive information (block 1940—NOT SENSITIVE), process 1900 may include providing the information to the online provider device in response to request (block 1950). If the information contains sensitive information (block 1940—SENSITIVE), process 1900 may include determining whether the website is safe or unsafe based on the website information and the connection information (block 1960). For example, in an implementation described above in connection with FIG. 4, if browser 215 determines that information 440 does not contain sensitive information, browser 215 may provide information 440 to online provider 220. However, if browser 215 determines that information 440 includes sensitive information, browser 215 may determine whether the website provided by online provider 220 is safe or unsafe based on the information associated with website connection 420, website information 430, and/or website lists 450.

As further shown in FIG. 19, if the website is safe (block 1960—SAFE), process 1900 may include providing the information to the online provider device in response to the request (block 1970). If the website is unsafe (block 1960—UNSAFE), process 1900 may include providing, for display, a warning that sensitive information is to be transmitted to an unsafe website (block 1980). For example, in an implementation described above in connection with FIG. 4, if browser 215 determines that the website provided by online provider 220 is safe, browser 215 may provide information 440, including the sensitive information, to online provider 220. However, if browser 215 determines that the website provided by online provider 220 is unsafe, browser 215 may display, to user 410, warning 460 that indicates that sensitive information is about to be transmitted to an unsafe website. User 410 may heed warning 460 and elect to not provide information 440 to online provider 220, or may ignore warning 460 and elect to provide information 440 to online provider 220. Alternatively, or additionally, browser 215 may prevent information 440 from being provided to online provider 220 when information 440 contains sensitive information and the website is unsafe.

Process block 1940 may include the process blocks depicted in FIG. 20. As shown in FIG. 20, process block 1940 may include performing pattern recognition on the information to determine whether the information contains sensitive information (block 2000), and/or performing heuristic recognition on the information to determine whether the information contains sensitive information (block 2010). For example, in an implementation described above in connection with FIG. 5, sensitive information determination component 500 may utilize pattern recognition, such as classification, regression, sequence labeling, parsing, etc., to determine whether information 440 includes sensitive information. In one example, if information 440 includes numbers with a particular format, such as a credit card number (e.g., 1234-5678-9123-4567) or a social security number (e.g., 123-45-6789), the pattern recognition may be able to identify, with high confidence, such information as sensitive information.

Alternatively, or additionally, sensitive information determination component 500 may utilize heuristic recognition, such as contextual recognition, to determine whether information 440 includes sensitive information. For example, if sensitive information determination component 500 identifies a mailing address in information 440 and identifies a number pattern after the mailing address, sensitive information determination component 500 may utilize this contextual information to determine that the number pattern may be a credit card number.

Process block 1960 may include the process blocks depicted in FIG. 21. As shown in FIG. 21, process block 1960 may include determining the website to be unsafe when a secure connection is not established with the website (block 2100), determining the website to be unsafe when a secure connection with the website is broken (block 2110), and/or determining the website to be unsafe when the website is identified in a blacklist (block 2120). For example, in an implementation described above in connection with FIG. 5, if the information associated with website connection 420 indicates that website connection 420 is not a secure connection (e.g., a SSL connection), environment determination component 510 may determine the website to be unsafe. If the information associated with website connection 420 indicates that website connection 420 is a secure connection but that the secure connection is broken, environment determination component 510 may determine the website to be unsafe. If website lists 450 indicate that the website is listed on a blacklist included in website lists 450, environment determination component 510 may determine the website to be unsafe.

As further shown in FIG. 21, process block 1960 may include determining the website to be unsafe when encryption associated with the website is outdated (block 2130), determining the website to be unsafe when a certificate associated with the website is invalid, expired, or self signed (block 2140), and/or determining the website to be safe when the website is not identified as unsafe or when the website is identified in a whitelist (block 2150). For example, in an implementation described above in connection with FIG. 5, if website information 430 indicates that encryption associated with the website is outdated, environment determination component 510 may determine the website to be unsafe. If website information 430 indicates that a certificate associated with the website is not trusted (e.g., invalid, expired, self signed, etc.), environment determination component 510 may determine the website to be unsafe. Environment determination component 510 may determine the website to be safe when the website is not determined to be unsafe. Alternatively, or additionally, if website lists 450 indicate that the website is listed on a whitelist included in website lists 450, environment determination component 510 may determine the website to be safe.

Example Process for Storing Sensitive Information to Increase User Awareness and Trust in Online Information Exchange FIGS. 22-25 are flow charts of an example process 2200 for providing browser storage of sensitive information to increase user awareness and trust in online information exchange, according to an implementation described herein. In one implementation, process 2200 may be performed by client device 210 via browser 215. Alternatively, or additionally, some or all of process 2200 may be performed by another device or group of devices, including or excluding client device 210 and/or browser 215.

Figure 22:
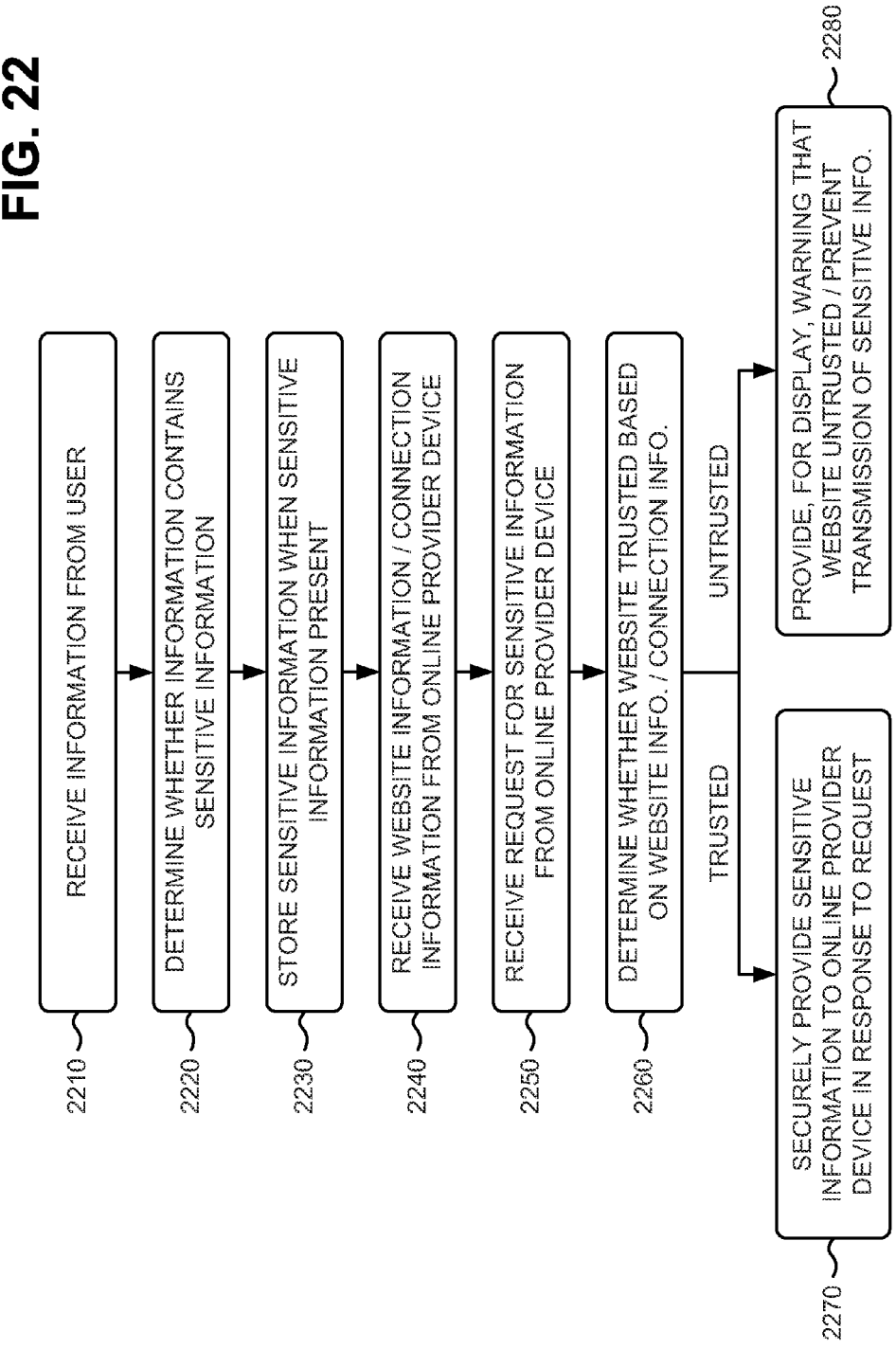
FIGS. 22-25 are flow charts of an example process for providing browser storage of sensitive information to increase user awareness and trust in online information exchange, according to an implementation described herein.

As shown in FIG. 22, process 2200 may include receiving information from a user (block 2210), determining whether the information contains sensitive information (block 2220), and storing the sensitive information when the sensitive information is present in the information (block 2230). For example, in an implementation described above in connection with FIG. 9, user 910 may provide information 950 to browser 215, and browser 215 may receive information 950. Information 950 may include information that may be automatically provided to trusted online provider 220 when requested by trusted online provider 220. In one example, information 950 may include a name, an address, credit card information, etc., associated with user 910, that online provider 220 may request in order to complete an online transaction. Browser 215 may determine whether information 950 contains any sensitive information, such as a credit card number, a social security number, a password, a PIN, a driver's license number, etc. Browser 215 may store the sensitive information contained in information 950 when browser 215 determines that information 950 includes sensitive information. Alternatively, or additionally, browser 215 may store information 950 regardless of whether browser 215 determines that information 950 includes sensitive information.

As further shown in FIG. 22, process 2200 may include receiving information associated with a website and connection information from an online provider device (block 2240), receiving a request for sensitive information from the online provider device (block 2250), and determining whether the website is trusted based on the website information and the connection information (block 2260). For example, in an implementation described above in connection with FIG. 9, browser 215 and trusted online provider 220 may establish a website connection with each other. Trusted online provider 220 may provide website information 960 to browser 215. Browser 215 may receive website information 960, and may display website information 960 to user 410, via a display of client device 210. Website information 960 may include information associated with the website provided by trusted online provider 220 to browser 215. Website information 960 may also include website connection information, such as information identifying whether the website connection is a secure connection, a broken connection, or an unsecure connection; information identifying whether encryption associated with the website connection is current or outdated; etc. In order to complete the order of the product or service, trusted online provider 220 may provide request 970 to browser 215, and browser 215 may receive request 970. Request 970 may include a request for information 950 stored by browser 215, such as a request for the sensitive information included in information 950. Prior to providing information 950 to trusted online provider 220, in response to request 970, browser 215 may determine whether the website provided by trusted online provider 220 is trusted or untrusted based on website information 960 and/or website lists 940.

Returning to FIG. 22, if the website is trusted (block 2260—TRUSTED), process 2200 may include securely providing the sensitive information to the online provider device in response to the request (block 2270). If the website is not trusted (block 2260—UNTRUSTED), process 2200 may include providing, for display, a warning that the website is untrusted and preventing transmission of the sensitive information (block 2280). For example, in an implementation described above in connection with FIG. 9, browser 215 may determine that the website provided by trusted online provider 220 is trusted, and may provide information 950, including the sensitive information, to trusted online provider 220 in a secure manner, such as via the trusted communication channel established with trusted online provider 220. Browser 215 may determine that the website provided by untrusted online provider 220 is untrusted, and may display, to user 910, a warning that indicates that the website is untrusted. User 910 may heed the warning and elect to not provide information 950 to untrusted online provider 220, or may ignore the warning and elect to provide information 950 to untrusted online provider 220. Alternatively, or additionally, browser 215 may prevent information 950 from being provided to untrusted online provider 220 when information 950 contains sensitive information and the website is untrusted.

Figure 23:
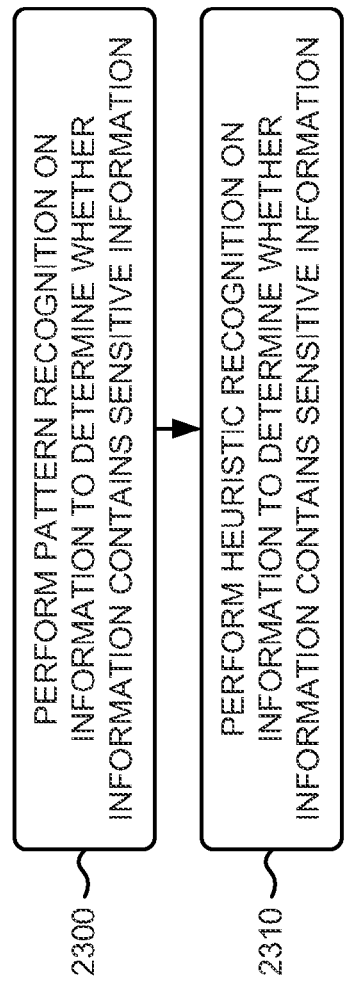

Process block 2220 may include the process blocks depicted in FIG. 23. As shown in FIG. 23, process block 2220 may include performing pattern recognition on the information to determine whether the information contains sensitive information (block 2300), and/or performing heuristic recognition on the information to determine whether the information contains sensitive information (block 2310). For example, in an implementation described above in connection with FIGS. 5 and 10, sensitive information determination component 1000 may include the features of sensitive information determination component 500. Sensitive information determination component 500 may utilize pattern recognition, such as classification, regression, sequence labeling, parsing, etc., to determine whether information 440 includes sensitive information. In one example, if information 440 includes numbers with a particular format, such as a credit card number (e.g., 1234-5678-9123-4567) or a social security number (e.g., 123-45-6789), the pattern recognition may be able to identify, with high confidence, such information as sensitive information. Alternatively, or additionally, sensitive information determination component 500 may utilize heuristic recognition, such as contextual recognition, to determine whether information 440 includes sensitive information. For example, if sensitive information determination component 500 identifies a mailing address in information 440 and identifies a number pattern after the mailing address, sensitive information determination component 500 may utilize this contextual information to determine that the number pattern may be a credit card number.

Figure 24:
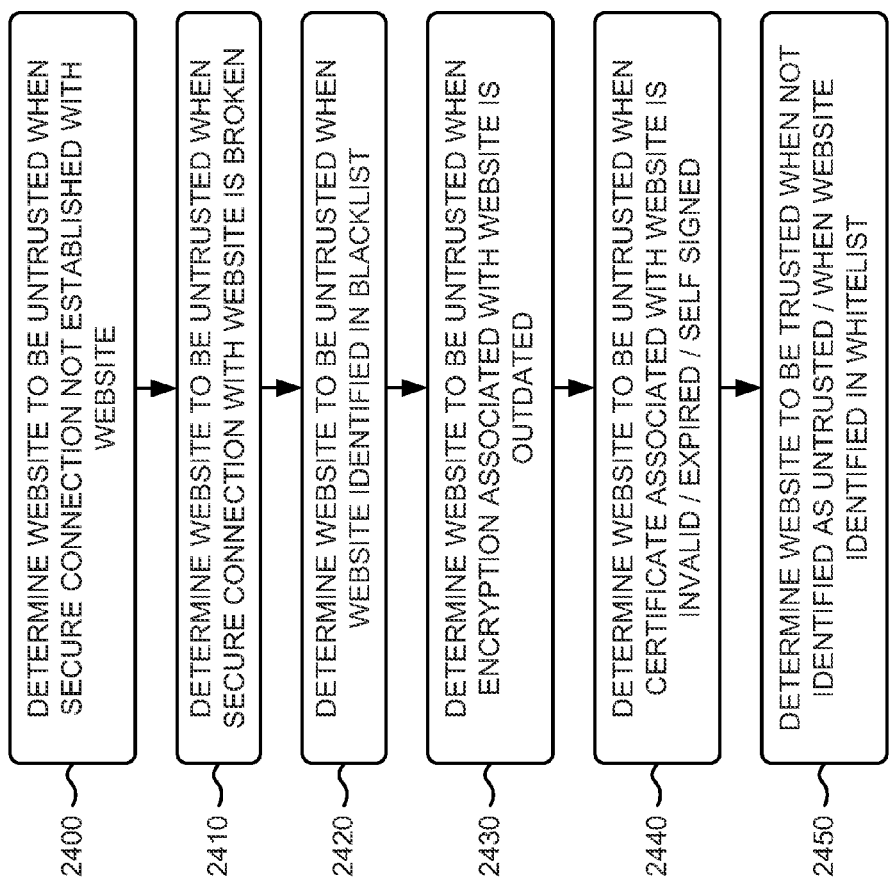

Process block 2260 may include the process blocks depicted in FIG. 24. As shown in FIG. 24, process block 2260 may include determining the website to be untrusted when a secure connection is not established with the website (block 2400), determining the website to be untrusted when a secure connection with the website is broken (block 2410), and/or determining the website to be untrusted when the website is identified in a blacklist (block 2420). For example, in an implementation described above in connection with FIG. 10, if the website connection information indicates that the website connection is not a secure connection, trusted/untrusted website determination component 1020 may determine the website to be untrusted. If the website connection information indicates that the website connection is a secure connection but that the secure connection is broken, trusted/untrusted website determination component 1020 may determine the website to be untrusted. If website lists 940 indicate that the website is listed on a blacklist included in website lists 940, trusted/untrusted website determination component 1020 may determine the website to be untrusted.

As further shown in FIG. 24, process block 2260 may include determining the website to be untrusted when encryption associated with the website is outdated (block 2430), determining the website to be untrusted when a certificate associated with the website is invalid, expired, or self signed (block 2440), and/or determining the website to be trusted when the website is not identified as untrusted or when the website is identified in a whitelist (block 2450). For example, in an implementation described above in connection with FIG. 10, if website information 960 indicates that encryption associated with the website is outdated, trusted/untrusted website determination component 1020 may determine the website to be untrusted. If website information 960 indicates that a certificate associated with the website is not trusted (e.g., invalid, expired, self signed, etc.), trusted/untrusted website determination component 1020 may determine the website to be untrusted. Trusted/untrusted website determination component 1020 may determine the website to be trusted when the website is not determined to be untrusted. Alternatively, or additionally, if website lists 940 indicate that the website is listed on a whitelist included in website lists 940, trusted/untrusted website determination component 1020 may determine the website to be trusted.

Figure 25:
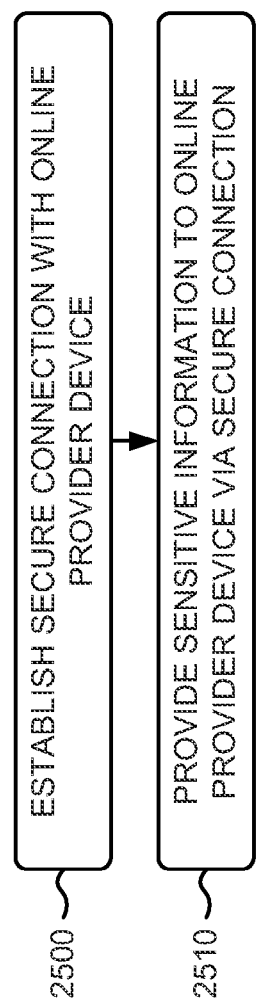

Process block 2270 may include the process blocks depicted in FIG. 25. As shown in FIG. 25, process block 2270 may include establishing a secure connection with the online provider device (block 2500), and providing the sensitive information to the online provider device via the secure connection (block 2510). For example, in an implementation described above in connection with FIG. 9, request 970 may include an API call that may be used to establish a secure (e.g., encrypted) communication channel between browser 215 and trusted online provider 220. Browser 215 may determine that the website provided by trusted online provider 220 is trusted, and may provide information 950, including the sensitive information, to trusted online provider 220 in a secure manner, such as via the trusted communication channel established with trusted online provider 220.

CONCLUSION

Systems and/or methods described herein may enable a browser to warn an unsuspecting user when the user is attempting to submit sensitive information in an unsafe environment, such as to an untrustworthy and/or unsecure website. The browser may also prevent the user from submitting the sensitive information to the unsafe environment. The sensitive information may include personal information, financial information, and/or other information. The sensitive information, if made public to an untrustworthy website, may compromise the user's financial accounts, identity, etc. To further protect the sensitive information, the browser may be a trusted intermediary of the sensitive information and may only disclose the sensitive information to trustworthy and/or secure websites.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 19-25, the order of the blocks may be modified in other implementations. Further, non-dependent blocks may be performed in parallel.

The term component, as used herein, is intended to be broadly construed to include hardware, such as, for example, a processor, a microprocessor, an application-specific integrated circuit (ASIC), a field-programmable gate array (FPGA), a chip, a memory device (e.g., a read only memory (ROM), a random access memory (RAM), etc.), etc.; or a combination of hardware and software, such as, for example, a processor, microprocessor, ASIC, etc. executing software contained in a memory device.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
 receiving, by a device and from an online provider device, website information associated with a website and connection information associated with the website;
 providing, by the device, the website for display to a user;
 receiving, by the device and from the user, information and a request to provide the information to the online provider device;
 identifying, by the device, a first portion of the information, the first portion including a mailing address;
 identifying, by the device, a second portion of the information;
 determining, by the device, whether the second portion includes sensitive information based on contextual adjacency of the first portion and the second portion,
  the sensitive information being financial information associated with the user when the second portion includes the sensitive information, and
  the financial information including a credit card number;
 determining, by the device and when the second portion includes the sensitive information, whether the website is safe or unsafe based on the website information and the connection information; and
 providing, by the device and when the website is an unsafe website, a warning for display to the user, the warning indicating that the sensitive information is to be transmitted to the unsafe website.

2. The method of claim 1, further comprising:
 providing the information to the online provider device, based on the request, when the second portion does not include the sensitive information.

3. The method of claim 1, further comprising:
 providing the information to the online provider device, based on the request, when the second portion includes the sensitive information and when the website is a safe website.

4. The method of claim 1, further comprising:
 preventing the device from providing the information to the online provider device when the second portion includes sensitive information and when the website is the unsafe website.

5. The method of claim 1, further comprising:
 determining that a third portion of the information includes other sensitive information, where the other sensitive information includes at least one of:
  personal information associated with the user,
  medical information associated with the user,
  online payment verification system information associated with the user, or
  password information associated with the user.

6. The method of claim 1,
 where the website information includes at least one of an encryption associated with the website or a certificate associated with the website;
 where the connection information includes information associated with a connection provided between the device and the online provider device; and
 where determining whether the website is safe or unsafe comprises at least one of:
  determining the website to be unsafe when the connection with the online provider device is an unsecure connection,
  determining the website to be unsafe when the connection with the online provider device is a broken secure connection,
  determining the website to be unsafe when the encryption associated with the website is outdated,
  determining the website to be unsafe when the certificate associated with the website is untrusted,
  determining the website to be safe when the connection with the online provider device is a secure, unbroken connection,
  determining the website to be safe when the encryption associated with the website is not outdated, or
  determining the website to be safe when the certificate associated with the website is trusted.

7. A device, comprising:
 a memory; and
 one or more processors to:
 receive, from an online provider device, content of a website and connection information associated with the website,
 provide the content of the website for display to a user,
 receive, from the user, information requested by the website and a request to provide the information to the online provider device,
 identify a first portion of the information,
 identify a second portion of the information,
 determine whether the second portion includes sensitive information based on contextual adjacency of the first portion and the second portion, the sensitive information being financial information associated with the user when the second portion includes the sensitive information,
 provide the information to the online provider device, based on the request, when the information does not include the sensitive information,
 determine, when the information includes the sensitive information, whether the website is safe or unsafe based on the connection information,
 determine, when the information includes the sensitive information, a quantity of portions of the information that include one or more of the sensitive information or other sensitive information, determine that the quantity of portions satisfies a particular threshold, and provide, when the website is an unsafe website, a warning for display to the user based on determining that the quantity of portions satisfies the particular threshold,
the warning indicating that the sensitive information is to be transmitted to the unsafe website.

8. The device of claim 7, where the one or more processors are further to:
provide the information to the online provider device, based on the request, when the second portion includes the sensitive information and when the website is a safe website.

9. The device of claim 7, where the one or more processors are further to:
prevent the device from providing the information to the online provider device when the second portion includes the sensitive information and when the website is the unsafe website.

10. The device of claim 7, where, when determining whether the website is safe or unsafe, the one or more processors are further to at least one of:
determine the website to be unsafe when a connection with the online provider device, as identified in the connection information, is an unsecure connection,
determine the website to be unsafe when the connection with the online provider device is a broken secure connection,
determine the website to be unsafe when an encryption associated with the website, as identified in the connection information, is outdated, or
determine the website to be unsafe when a certificate associated with the website, as identified in the connection information, is untrusted.

11. The device of claim 10, where the one or more processors are further to:
receive one or more blacklists of unsafe websites,
receive one or more whitelists of safe websites,
determine the website to be unsafe when the website is identified in one of the one or more blacklists, and
determine the website to be safe when the website is not identified as unsafe or when the website is identified in one of the one or more whitelists.

12. A non-transitory computer-readable medium storing instructions, the instructions comprising:
one or more instructions that, when executed by one or more processors of a device, cause the one or more processors to:
receive one or more lists of unsafe websites and one or more lists of safe websites,
receive, from an online provider device, content of a website and connection information associated with the website,
provide the content of the website for display to a user,
receive, from the user, information requested by the website,
receive, from the user, a request to provide the information to the online provider device,
identify a first portion of the information,
the first portion including a mailing address,
identify a second portion of the information,
determine whether the second portion includes sensitive information based on contextual adjacency of the first portion and the second portion,
the sensitive information being financial information associated with the user when the second portion includes the sensitive information, and
the financial information including a credit card number,
provide the information to the online provider device, based on the request, when the information does not include the sensitive information,
determine, when the information includes the sensitive information, whether the website is safe or unsafe based on the connection information, the one or more lists of unsafe websites, and the one or more lists of safe websites, and
provide a warning for display to the user when the information includes the sensitive information and when the website is an unsafe website,
the warning indicating that the sensitive information is to be transmitted to the unsafe website.

13. The non-transitory computer-readable medium of claim 12, where the instructions further comprise:
one or more instructions that, when executed by the one or more processors of the device, cause the one or more processors to:
provide the information to the online provider device, based on the request, when the information includes the sensitive information and when the website is a safe website.

14. The non-transitory computer-readable medium of claim 12, where the instructions further comprise:
one or more instructions that, when executed by the one or more processors of the device, cause the one or more processors to:
prevent the device from providing the information to the online provider device when the information includes the sensitive information and when the website is the unsafe website.

15. The non-transitory computer-readable medium of claim 12, where the instructions further comprise:
one or more instructions that, when executed by the one or more processors of the device, cause the one or more processors to:
determine that a third portion of the information includes other sensitive information, and
where the other sensitive information includes at least one of:
personal information associated with the user,
medical information associated with the user,
online payment verification system information associated with the user, or
password information associated with the user.

16. The non-transitory computer-readable medium of claim 12, where the instructions further comprise:
one or more instructions that, when executed by the one or more processors of the device, cause the one or more processors to at least one of:
determine the website to be unsafe when a connection with the online provider device, as identified in the connection information, is an unsecure connection,
determine the website to be unsafe when the connection with the online provider device is a broken secure connection,
determine the website to be unsafe when the website is identified in one of the one or more lists of unsafe websites,
determine the website to be unsafe when an encryption associated with the website, as identified in the connection information, is outdated, determine the website to be unsafe when a certificate associated with the website, as identified in the connection information, is untrusted, determine the website to be safe when the connection with the online provider device is a secure, unbroken connection, determine the website to be safe when the encryption associated with the website is not outdated, or determine the website to be safe when the certificate associated with the website is trusted.

17. The method of claim 1, where determining whether the second portion includes the sensitive information comprises:

determining that the second portion identifies a number pattern or unique or unidentifiable information, and determining that the second portion includes the sensitive information based on the contextual adjacency of the first portion and the second portion and based on determining that the second portion identifies the number pattern or the unique or unidentifiable information.

18. The non-transitory computer-readable medium of claim 12, where the one or more instructions to provide the warning for display to the user comprise:

one or more instructions that, when executed by the one or more processors, cause the one or more processors to:

determine, when the information includes the sensitive information, a quantity of portions of the information that include the sensitive information and other sensitive information, determine that the quantity of portions satisfies a particular threshold, and provide, when the website is the unsafe website, the warning for display to the user based on determining that the quantity of portions satisfies the particular threshold.

19. The device of claim 7, where, when determining whether the second portion includes sensitive information based on contextual adjacency of the first portion and the second portion, the one or more processors are to:

determine that the second portion is unique or unidentifiable, and determine that the second portion includes the sensitive information based on the contextual adjacency of the first portion and the second portion and based on determining that the second portion is unique or unidentifiable.

* * * * *